(12) United States Patent
Minagawa et al.

(10) Patent No.: US 8,418,050 B2
(45) Date of Patent: Apr. 9, 2013

(54) COMPUTER READABLE RECORDING MEDIUM ON WHICH FORM DATA EXTRACTING PROGRAM IS RECORDED, FORM DATA EXTRACTING APPARATUS, AND FORM DATA EXTRACTING METHOD

(75) Inventors: Akihiro Minagawa, Kawasaki (JP); Hiroshi Tanaka, Kawasaki (JP); Noriaki Ozawa, Kawasaki (JP); Hiroaki Takebe, Kawasaki (JP); Yusaku Fujii, Kawasaki (JP); Yoshinobu Hotta, Kawasaki (JP); Katsuhito Fujimoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 909 days.

(21) Appl. No.: 12/267,253

(22) Filed: Nov. 7, 2008

(65) Prior Publication Data
US 2009/0125797 A1 May 14, 2009

(30) Foreign Application Priority Data
Nov. 9, 2007 (JP) .................................. 2007-292619

(51) Int. Cl.
*G06F 17/00* (2006.01)

(52) U.S. Cl. ...................................... 715/221; 715/200

(58) Field of Classification Search .................. 715/200, 715/221–225
See application file for complete search history.

(56) References Cited

U.S. PATENT DOCUMENTS

| | | | | |
|---|---|---|---|---|
| 5,434,962 | A * | 7/1995 | Kyojima et al. | 715/234 |
| 5,815,704 | A * | 9/1998 | Shimotsuji et al. | 358/403 |
| 7,107,527 | B2 * | 9/2006 | Takahashi et al. | 715/234 |
| 7,458,024 | B2 * | 11/2008 | Itoh et al. | 715/271 |
| 7,725,814 | B2 * | 5/2010 | Degtyar | 715/221 |
| 7,840,891 | B1 * | 11/2010 | Yu et al. | 715/223 |
| 2005/0278628 | A1 * | 12/2005 | Itoh et al. | 715/531 |
| 2008/0244378 | A1 * | 10/2008 | Chen et al. | 715/226 |
| 2009/0087094 | A1 * | 4/2009 | Deryagin et al. | 382/180 |
| 2010/0080493 | A1 * | 4/2010 | McGatha et al. | 382/321 |

FOREIGN PATENT DOCUMENTS
JP A 2000-285190 10/2000

* cited by examiner

*Primary Examiner* — Manglesh M Patel
(74) *Attorney, Agent, or Firm* — Greer, Burns & Crain, Ltd.

(57) ABSTRACT

The form data extracting apparatus, even input form does not have a logical structure stored in the generic logical structure DB, by using logical elements in the existing logical structure and a registered form obtained on the basis of (a) the logical structure, (b) pieces of position information of the logical elements, and (c) a relation between the logical elements. A logical element and a logical structure are extracted from the input form, and the extracted logical structure can be defined as a new registered form or a new logical structure.

8 Claims, 31 Drawing Sheets

FIG. 2

ESTIMATION SHEET

DATE: APRIL 1, 2007

B CORPORATION

A CORPORATION

| PRODUCT NAME | NUMBER | UNIT PRICE | MONEY AMOUNT |
|---|---|---|---|
| AA | 10 | 100 | 1,000 |
| BB | 1 | 200 | 200 |

| | |
|---|---|
| SUBTOTAL | 1,200 |
| CONSUMPTION TAX | 60 |
| TOTAL | 1,260 |

DELIVERY DATE: APRIL 1, 2007

FIG. 3

ESTIMATION SHEET

DATE: APRIL 1, 2007

B CORPORATION

A CORPORATION

| PRODUCT NAME | NUMBER | UNIT PRICE | MONEY AMOUNT |
|---|---|---|---|
| AA | 10 | 100 | 1,000 |
| BB | 1 | 200 | 200 |

| SUBTOTAL | 1,200 |
|---|---|
| CONSUMPTION TAX | 60 |
| TOTAL | 1,260 |

FIG. 4

| LOGICAL ELEMENT NUMBER | LOGICAL ELEMENT NAME | SUPERORDINATE HEADER | CHARACTER STRING NUMBER | CHARACTER STRING | RELATION TO SUPERORDINATE HEADER |
|---|---|---|---|---|---|
| 1 | TITLE | NONE | 1 | "ESTIMATION SHEET" | NONE |
| 2 | DELIVERY DESTINATION DATA | NONE | 1 | "CORPORATION" | NONE |
| | | | 2 | "CORP*" | NONE |
| | | | 3 | "*CORPORATION" | NONE |
| 3 | CREATION DATE HEADER | NONE | 1 | "DATE" | NONE |
| | | | 2 | "CREATION DATE" | NONE |
| | | | 3 | "YEAR, MONTH, DATE" | NONE |
| 4 | CREATION DATE DATA | DATE HEADER | 1 | "*YEAR, *MONTH, *DATE" | "UPPER, LEFT, UPPER LEFT" |
| | | | 2 | "*/*/*" | "UPPER, LEFT, UPPER LEFT" |
| | | | 3 | "*-*-*" | "UPPER, LEFT, UPPER LEFT" |
| 5 | SENDER DATA | NONE | 1 | "CORPORATION*" | NONE |
| | | | 2 | "CORP*" | NONE |
| | | | 3 | "*CORPORATION" | NONE |

FIG. 5

| No | LOGICAL ELEMENT | CHARACTER STRING | COORDINATE | CENTER OF GRAVITY |
|---|---|---|---|---|
| 1 | TITLE | ESTIMATION SHEET | (100, 10 – 160, 30) | (130, 20) |
| 2 | DELIVERY DESTINATION DATA | B CORPORATION | (10, 30 – 70, 50) | (40, 40) |
| 3 | SENDER HEADER | DATE | (100, 10 – 140, 30) | (120, 20) |
| 4 | CREATION DATE DATA | APRIL 1, 2007 | (150, 10 – 210, 30) | (180, 20) |
| 5 | SENDER DATA | A CORPORATION | (140, 40 – 200, 60) | (170, 50) |

FIG. 6

(1) CORRECT LOGICAL STRUCTURE

| No | LOGICAL ELEMENT | CHARACTER STRING | COORDINATE | CENTER OF GRAVITY |
|---|---|---|---|---|
| 1 | TITLE | ESTIMATION SHEET | (100, 10 – 160, 30) | (130, 20) |
| 2 | DELIVERY DESTINATION DATA | B CORPORATION | (10, 30 – 70, 50) | (40, 40) |
| 3 | CREATION DATE HEADER | DATE | (100, 10 – 140, 30) | (120, 20) |
| 4 | CREATION DATE DATA | APRIL 1, 2007 | (150, 10 – 210, 30) | (180, 20) |
| 5 | SENDER DATA | A CORPORATION | (140, 40 – 200, 60) | (170, 50) |

(1) RECOGNIZED LOGICAL STRUCTURE

| No | LOGICAL ELEMENT | CHARACTER STRING | COORDINATE | CENTER OF GRAVITY |
|---|---|---|---|---|
| 1 | TITLE | ESTIMATION SHEET | (105, 10 – 165, 30) | (135, 20) |
| 2 | DELIVERY DESTINATION DATA | B CORPORATION | (15, 30 – 75, 50) | (45, 40) |
| 3 | CREATION DATE HEADER | DELIVERY DATE | (35, 100 – 85, 120) | (55, 110) |
| 4 | CREATION DATE DATA | JUNE 1, 2007 | (85, 120 – 135, 140) | (110, 130) |
| 5 | SENDER DATA | A CORPORATION | (145, 40 – 205, 60) | (175, 50) |

FIG. 15

| PRODUCT NAME | NUMBER | UNIT PRICE | MONEY AMOUNT |
|---|---|---|---|
| AA | 10 | 100 | 1,000 |
| BB | 1 | 200 | 200 |

| | |
|---|---|
| SUBTOTAL | 1,200 |
| CONSUMPTION TAX | 60 |
| TOTAL | 1,260 |

ESTIMATION SHEET : TITLE

CREATION DATE CREATION DATE DATA
DATE: APRIL 1, 2007

A CORPORATION : SENDER

DELIVERY DESTINATION
B CORPORATION

FIG. 16

DELIVERY DESTINATION: B CORPORATION

ESTIMATION SHEET — TITLE

CREATION DATE DATA (RE-EXTRACTED)

CREATION DATE — DATE: APRIL 1, 2007

A CORPORATION — SENDER

| PRODUCT NAME | NUMBER | UNIT PRICE | MONEY AMOUNT |
|---|---|---|---|
| AA | 10 | 100 | 1,000 |
| BB | 1 | 200 | 200 |

| | | |
|---|---|---|
| SUBTOTAL | | 1,200 |
| CONSUMPTION TAX | | 60 |
| TOTAL | | 1,260 |

DELIVERY DATE: JUNE 1, 2007

CREATION DATE DATA (UNEXTRACTED)

CREATION DATE

FIG. 17

| No | LOGICAL ELEMENT | CHARACTER STRING | COORDINATE | CENTER OF GRAVITY |
|---|---|---|---|---|
| 1 | TITLE | ESTIMATION SHEET | (105, 10 – 165, 30) | (135, 20) |
| 2 | DELIVERY DESTINATION DATA | B CORPORATION | (15, 30 – 75, 50) | (45, 40) |
| 3 | CREATION DATE HEADER | DELIVERY DATE | (35, 100 – 85, 120) | (55, 110) |
| 4 | CREATION DATE DATA | JUNE 1, 2007 | (85, 120 – 135, 140) | (110, 130) |
| 5 | SENDER DATA | A CORPORATION | (145, 40 – 205, 60) | (175, 50) |

FIG. 18

| No | LOGICAL ELEMENT | CHARACTER STRING | COORDINATE | CENTER OF GRAVITY |
|---|---|---|---|---|
| 1 | TITLE | ESTIMATION SHEET | (105, 10 – 165, 30) | (135, 20) |
| 2 | DELIVERY DESTINATION DATA | B CORPORATION | (15, 30 – 75, 50) | (45, 40) |
| 3 | CREATION DATE HEADER | DATE | (105, 10 – 145, 30) | (125, 110) |
| 4 | CREATION DATE DATA | APRIL 1, 2007 | (155, 10 – 215, 30) | (185, 130) |
| 5 | SENDER DATA | A CORPORATION | (145, 40 – 205, 60) | (175, 50) |

FIG. 20

DELIVERY DESTINATION

[B CORPORATION]

[ESTIMATION SHEET] TITLE

[A CORPORATION] SENDER

[DATE: APRIL 1, 2007]

| PRODUCT NAME | NUMBER | UNIT PRICE | MONEY AMOUNT |
|---|---|---|---|
| AA | 10 | 100 | 1,000 |
| BB | 1 | 200 | 200 |

| SUBTOTAL | 1,200 |
|---|---|
| CONSUMPTION TAX | 60 |
| TOTAL | 1,260 |

FIG. 21

DELIVERY DESTINATION  CREATION DATE  CREATION DATE DATA

[ESTIMATION SHEET] TITLE

[DATE: APRIL 1, 2007]

[A CORPORATION] SENDER

[B CORPORATION]

| PRODUCT NAME | NUMBER | UNIT PRICE | MONEY AMOUNT |
|---|---|---|---|
| AA | 10 | 100 | 1,000 |
| BB | 1 | 200 | 200 |

| | |
|---|---|
| SUBTOTAL | 1,200 |
| CONSUMPTION TAX | 60 |
| TOTAL | 1,260 |

FIG. 23

ESTIMATION SHEET

A CORPORATION : SENDER

CREATION DATE  CREATION DATE DATA

DATE: APRIL 1, 2007

B CORPORATION

| PRODUCT NAME | NUMBER | UNIT PRICE | MONEY AMOUNT |
|---|---|---|---|
| AA | 10 | 100 | 1,000 |
| BB | 1 | 200 | 200 |

| | | |
|---|---|---|
| SUBTOTAL | | 1,200 |
| CONSUMPTION TAX | | 60 |
| TOTAL | | 1,260 |

FIG. 25

| LOGICAL ELEMENT | CHARACTER STRING | COORDINATE | CENTER OF GRAVITY |
|---|---|---|---|
| TITLE | ESTIMATION SHEET | (100, 10 – 160, 30) | (130, 20) |
| DELIVERY DESTINATION DATA | B CORPORATION | (10, 30 – 70, 50) | (40, 40) |
| CREATION DATE | DATE | (100, 10 – 140, 30) | (120, 20) |
| CREATION DATE DATA | APRIL 1, 2007 | (150, 30 – 210, 50) | (180, 40) |
| SENDER | A CORPORATION | (140, 40 – 200, 60) | (170, 50) |

FIG. 26

| LOGICAL ELEMENT | CHARACTER STRING | COORDINATE | CENTER OF GRAVITY |
|---|---|---|---|
| TITLE | ESTIMATION SHEET | (10, 10 – 80, 30) | (100, 30) |
| DELIVERY DESTINATION DATA | B CORPORATION | (100, 30 – 140, 50) | (120, 40) |
| CREATION DATE | DATE | (100, 10 – 160, 30) | (100, 30) |
| CREATION DATE DATA | APRIL 1, 2007 | (170, 30 – 230, 50) | (200, 40) |
| SENDER | A CORPORATION | (150, 10 – 210, 30) | (180, 20) |

FIG. 27

| LOGICAL ELEMENT | CHARACTER STRING | COORDINATE | CENTER OF GRAVITY |
|---|---|---|---|
| TITLE | ESTIMATION SHEET | (100, 10 – 160, 30) | (130, 20) |
| DELIVERY DESTINATION DATA | B CORPORATION | (10, 30 – 70, 50) | (40, 40) |
| CREATION DATE | DATE | (110, 40 – 170, 60) | (100, 30) |
| CREATION DATE DATA | APRIL 1, 2007 | (180, 60 – 240, 80) | (210, 70) |
| SENDER | A CORPORATION | (140, 40 – 200, 60) | (170, 50) |

FIG. 29

DELIVERY DESTINATION  ESTIMATION SHEET : TITLE  CREATION DATE  CREATION DATE DATA

B CORPORATION  DATE: APRIL 1, 2007  A CORPORATION : SENDER

| PRODUCT NAME | NUMBER | UNIT PRICE | MONEY AMOUNT |
|---|---|---|---|
| AA | 10 | 100 | 1,000 |
| BB | 1 | 200 | 200 |

| SUBTOTAL | CONSUMPTION TAX | TOTAL |
|---|---|---|
| SUBTOTAL | CONSUMPTION TAX | TOTAL |
| 1,200 | 60 | 1,260 |
| SUBTOTAL DATA | TAX DATA | TOTAL DATA |

FIG. 30

ESTIMATION SHEET TITLE    CREATION DATE CREATION DATE DATA

DATE: APRIL 1, 2007

A CORPORATION  SENDER

DELIVERY DESTINATION

B CORPORATION

| PRODUCT NAME | NUMBER | UNIT PRICE | MONEY AMOUNT |
|---|---|---|---|
| AA | 10 | 100 | 1,000 |
| BB | 1 | 200 | 200 |

| | |
|---|---|
| SUBTOTAL | 1,200 |
| CONSUMPTION TAX | 60 |
| TOTAL | 1,260 |

FIG. 31

ESTIMATION SHEET

DATE: APRIL 1, 2007

A CORPORATION

B CORPORATION

| PRODUCT NAME | NUMBER | UNIT PRICE | MONEY AMOUNT |
|---|---|---|---|
| AA | 10 | 100 | 1,000 |
| BB | 1 | 200 | 200 |

| SUBTOTAL | CONSUMPTION TAX | TOTAL |
|---|---|---|
| SUBTOTAL | CONSUMPTION TAX | TOTAL |
| 1,200 | 60 | 1,260 |
| SUBTOTAL DATA | TAX DATA | TOTAL DATA |

COMPUTER READABLE RECORDING MEDIUM ON WHICH FORM DATA EXTRACTING PROGRAM IS RECORDED, FORM DATA EXTRACTING APPARATUS, AND FORM DATA EXTRACTING METHOD

CROSS-REFERENCE TO RELATED APPLICATION

This application is based upon and claims the benefit of priority of the prior Japanese Patent Application No. 2007-292619, filed on Nov. 9, 2007, the entire contents of which are incorporated herein by reference.

BACKGROUND OF THE INVENTION

1. Field of the Invention

A conventional OCR which converts an image of a typewritten document serving as a paper form or an electronic form into a character code format which can be edited by a computer is known. Such a conventional OCR is a very useful apparatus which, when information of a handwritten form or the like is input to a computer, saves the effort of re-inputting the information in the computer.

2. Description of the Related Art

However, in the conventional OCR, information of a form or the like formed by handwriting having a peculiar style or formed by a computer cannot be correctly read. Therefore, various techniques which correctly read various pieces of information to convert the information into character codes or the like have been disclosed.

For example, Japanese Patent Application Laid-Open No. 2000-285190 discloses a data input apparatus such as an OCR which extracts a similar registered form from a predetermined registered form by using pieces of information such as ruled lines, characters, and colors extracted from an input form to extract recognized information in a defined region on the extracted registered form.

However, in the conventional technique, when the input form even partially changes (for example, a new fiscal year or a color change), an appropriate registered form cannot be extracted. This is disadvantageous because the recognized information cannot be extracted from the input form. When the input form even partially changes, a user must register a new input form each time the input form changes. The registering operation is cumbersome, and the user disadvantageously bears a heavy burden. In addition, since the contents to be registered is not relevant to data extracted from the form, a form registering operation and designation of a data region must be independently performed.

SUMMARY

According to an aspect of an embodiment, there is provided a form data extracting apparatus which extracts a logical structure of an input input form, including: a registered form storing unit which stores a plurality of forms; a generic logical structure storing unit which stores a logical structure representing logical elements in various forms and a relation between the logical elements; a registered form data storing unit which, in association with the various forms stored in the registered form storing unit, stores (a) registered form data representing logical elements on the registered forms acquired on the basis of the logical structure stored in the generic logical structure storing unit, (b) pieces of position information of the logical elements, and (c) a relation between the logical elements; an input form data extracting unit which, for the input form, on the basis of the logical structure stored in the generic logical structure storing unit, extracts input form data representing the logical elements on the input form, the pieces of position information of the logical elements, and the relation between the logical elements; a form specifying unit which, on the basis of the input form data extracted by the input form data extracting unit, specifies registered form data similar to the input form data in the registered form data storing means; and a data generating unit which, on the basis of the pieces of position information of the logical elements of the registered form data similar to the input form data specified by the form specifying means and the relation between the logical elements, re-extracts input form data from the input form, extracts a logical element which cannot be re-extracted from the input form data, and generates the re-extracted input form data as new registered form data.

BRIEF DESCRIPTION OF THE DRAWINGS

FIG. 2 is a diagram showing an example of an input form;

FIG. 3 is a diagram showing an example of a registered form stored in a registered form DB 21 and a logical structure recognition result of an input form;

FIG. 4 is a diagram showing an example of a logical structure stored in a generic logical structure DB 22;

FIG. 5 is a diagram showing an example of registered form data stored in a registered form data DB 23;

FIG. 6 is a diagram showing an example of a correct logical structure extracted from an input form and a recognized logical structure;

FIG. 15 is a diagram showing an example of a registered form;

FIG. 16 is a diagram showing an example of an input form;

FIG. 17 is a diagram showing an example of a result obtained by logical structure recognition in acceptance of an input form;

FIG. 18 is a diagram showing an example in which data is re-extracted by using coordinates of logical elements of the optimum registered form;

FIG. 20 is a diagram showing an example of an input form;

FIG. 21 is a diagram showing an example of a selected optimum registered form;

FIG. 23 is a diagram showing an example of a selected secondary registered form;

FIG. 25 is a diagram showing an example of an optimum registered form;

FIG. 26 is a diagram showing an example of a secondary registered form;

FIG. 27 is a diagram showing an example of input form data finally extracted;

FIG. 29 is a diagram showing an example of an input form;

FIG. 30 is a diagram showing a registered form in which an upper central portion of the input form is matched;

FIG. 31 is a diagram showing a registered form in which a lower central portion of the input form is matched;

DETAILED DESCRIPTION OF THE PREFERRED EMBODIMENTS

Embodiments of a form data extracting program will be described below in detail with reference to the accompanying drawings. Main terms used in the embodiments, outlines and characteristics of the form data extracting apparatuses according to the embodiments, configurations of the form data extracting apparatuses, and flows of processes will be sequentially described below, and various modifications of the embodiments will be described at the last.

First Embodiment

First, an outline and characteristics of a form data extraction according to a first embodiment will be described below. A form data extracting apparatus according to the first embodiment includes a registered form storage DB in which a plurality of forms (for example, a settlement form, an accounting form, a personnel form, and the like) are stored in advance. A generic logical structure DB stores a logical structure showing logical elements, pieces of position information of the logical elements, and relations between the logical elements in various forms, and an OCR (Optical Character Recognition) converts an image of a typewritten document into a format (character code string) which can be edited by a computer.

In this configuration, the form data extracting apparatus according to the first embodiment has an outline in which the logical structure of an input input form is extracted on the basis of a logical structure stored in the generic logical structure DB. In particular, as characteristic features, data which is not a registered form can be easily extracted, and a new registered form can be easily formed.

More specifically, in the form data extracting apparatus according to the first embodiment, even though an input form which does not have a logical structure stored in the generic logical structure DB is input, by using logical elements (for example, a header or the like) in the existing logical structure and a registered form obtained on the basis of the logical structure, pieces of position information of the logical elements (for example, a center of gravity, coordinates, and the like of the header), and a relation between the logical elements (for example, a distance between headers or the like), a logical element and a logical structure are extracted from the input form, and the extracted logical structure can be defined as a new registered form or a new logical structure. As a result, a registered form need not be artificially formed and registered to extract logical elements or the like from an input form which does not have the logical structure stored in the generic logical structure DB, data can be easily extracted from even a form which is not registered in advance, and a new registered form can be easily formed.

Figure 1:
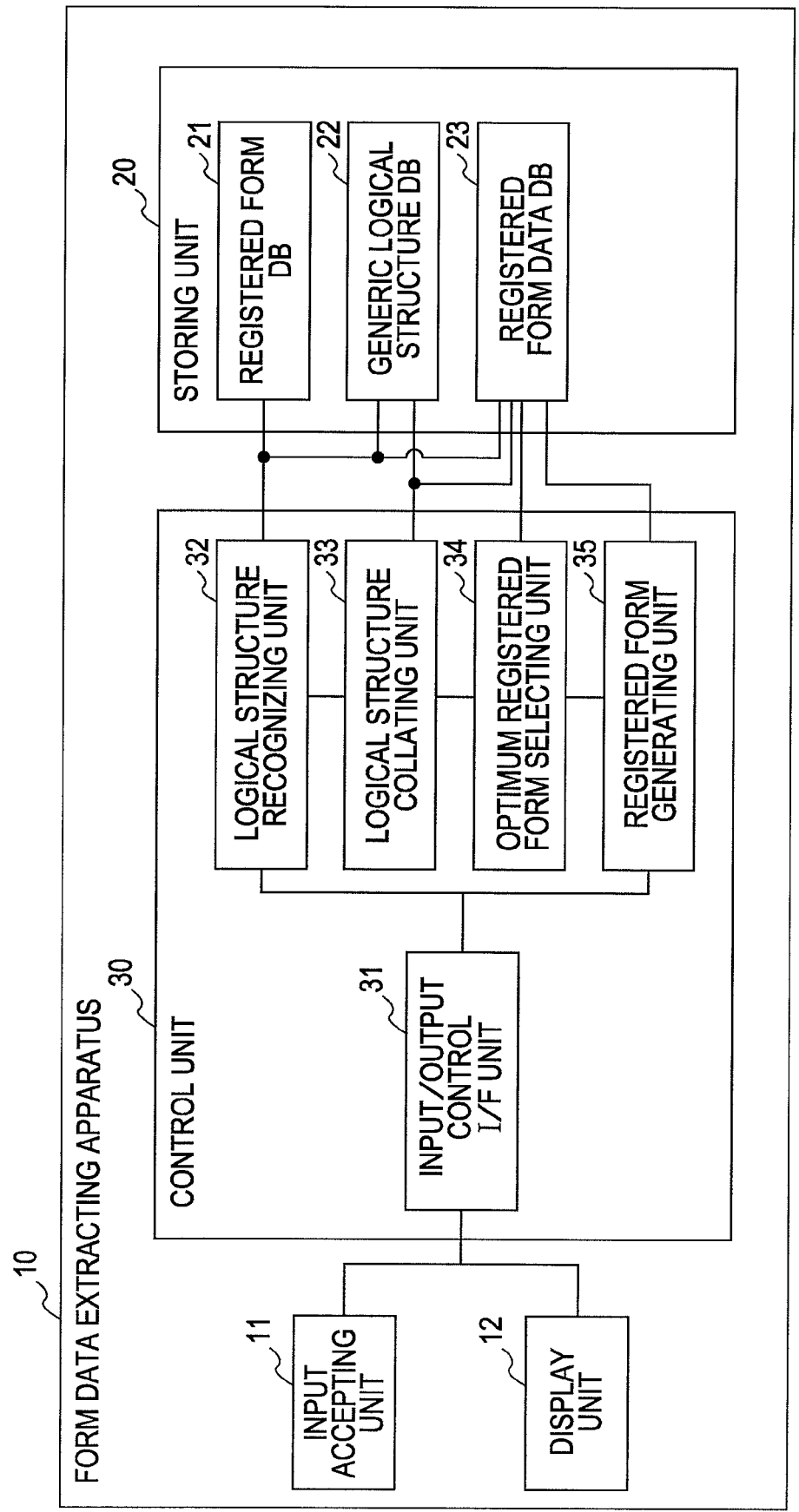
FIG. 1 is a block diagram showing a configuration of a form data extracting apparatus according to a first embodiment.

A configuration of a form data extracting apparatus will be described below with reference to FIG. 1. FIG. 1 is a block diagram showing the configuration of the form data extracting apparatus according to the first embodiment. As shown in FIG. 1, form data extracting apparatus 10 includes an input accepting unit 11, a display unit 12, a storing unit 20, and a control unit 30.

The input accepting unit 11 accepts various forms. More specifically, the input accepting unit 11 accepts a form image of a paper medium as shown in FIG. 2 to cause an OCR to read the image, or accepts form image data of a file format through a network or various storage media, to output the accepted data to an input/output control I/F unit 31 (described below). FIG. 2 is a diagram showing an example of an input form.

The display unit 12 includes a monitor (display or touch panel) and a loudspeaker to output various pieces of information. For example, the display unit 12 displays and outputs an input form recognized by the control unit 30 (described later) or the like through the input/output control I/F unit 31.

The storing unit 20 stores data and a program necessary for various processes performed by the control unit 30 and includes, especially as components closely relevant to the present invention, a registered form DB 21, a generic logical structure DB 22, and a registered form data DB 23.

The registered form DB 21 stores a plurality of forms in advance. More specifically, for example, a plurality of forms of different types such as a settlement form, an accounting form, and a personnel form recognized or artificially registered in advance are stored in the registered form DB 21 as registered forms. For example, the registered form DB 21 stores the forms as shown in FIG. 3 as a registered form. FIG. 3 is a diagram showing an example of a registered form stored in the registered form data DB 23 and a logical structure recognition result of an input form. The registered form in FIG. 3 is almost the same as the input form in FIG. 2. The registered form may be partially different from the input form.

The generic logical structure DB 22 stores a logical structure showing logical elements in the various forms and a relation between the logical elements. More specifically, for example, the generic logical structure DB 22 stores a logical structure for logical elements representing a header and data, a relation between the logical elements such as a relation between a headline and a subheading, or a relation between a header and data (A main header (superordinate header) of data of "document creation date" is defined as a header "document creation date". In this case, the superordinate header means a semantic hierarchical relation between "creation date data" and "creation date header" or between a subheading "family name" and a headline "full name", and does not mean a hierarchical relation on a form image.) Other logical elements include a character string itself by which the logical elements are expressed on a form, and an attribute of the character string, and the like.

The logical structure stored in the generic logical structure DB 22 shown in FIG. 4 includes a "logical element number" uniquely allocated to find a logical element on a form, a "logical element name" representing a name of each of the logical elements, a "superordinate header" representing a logical element located at a semantic position higher than those of the logical elements, a "character string number" to find a character string included in each of the logical element names, a "character string" representing a character string included in each of the logical element names, and a "relation to superordinate position" representing a relation between each of the character strings and a superordinate logical element (character string) of the character string. The header of the "document creation date" appears as a "creation date", a "date", and "year, month, and date", or the like. It is assumed that, as the data of the "document creation date", the possibility of description is stored by using a normal expression such as "*year*month*date" or "*/*/*". One logical structure is formed for each of the form types. For example, the generic logical structure DB 22 stores "1, title, nothing, 1, estimation sheet, nothing", "2, destination data, nothing, 1, corporation, nothing", "-, -, -, 2, (Corp), nothing", or the like as "logical element number, logical element name, superordinate header, character string number, character string, and relation to superordinate header". FIG. 4 is a diagram showing an example of a logical structure stored in the generic logical structure DB 22.

The registered form data DB 23 stores registered form data representing logical elements on the registered form acquired on the basis of the logical structure stored in the generic logical structure DB 22, pieces of position information of the logical elements, and a relation between the logical elements in association with various forms stored in the registered form DB 21. More specifically, for example, the registered form data DB 23 stores registered form data, as shown in FIG. 5, extracted and stored by a logical structure recognizing unit 32 (described later). The registered form data DB 23 may store an evaluation value or the like representing newness or the like of the data expressed by a creation date.

As the registered form data stored in the registered form data DB 23 shown in FIG. 5, a logical element number "No" which uniquely identifies an extracted logical element and a logical element name "logical element" representing the extracted logical element, are stored. As these logical elements, logical elements to which the generic logical structure corresponds are given. In addition, as the registered form data, a "character string" representing a character string of a logical element extracted from each of the registered forms, "coordinates" representing coordinates on the registered form on which the extracted logical element (character string) is located, and a "center of gravity" representing a center of gravity of the extracted character string are stored. For example, the registered form data DB 23 stores "1, title, estimation sheet, (100, 10-160, 30), (130, 20)" or the like as "No, logical element, character string, coordinates, center of gravity". In this case, the coordinates are expressed as a rectangle "x, y-x, y" where the left end on the form, the right direction, and the lower direction are defined as "0,0", "x", and "y", respectively. FIG. 5 is a diagram showing an example of the registered form data stored in the registered form data DB 23.

The control unit 30 has an internal memory to store a control program such as an OS (Operating System), a program which regulates various procedures or the like, and required data, and includes, as units especially relevant to the present invention, the input/output control I/F unit 31, a logical structure recognizing unit 32, a logical structure collating unit 33, an optimum registered form selecting unit 34, and a registered form generating unit 35. The control unit 30 executes various processes by using these units. Since the detailed processes of the functional units in the control unit 30 will be described in the explanation of FIG. 7, outlines of the functional units are described here.

The input/output control I/F unit 31 displays various pieces of information on the display unit 12, and accepts an operation of a user through the display unit 12. More specifically, the input/output control I/F unit 31 outputs a form accepted by the input accepting unit 11 to the logical structure recognizing unit 32 as a form image and displays and outputs a recognition result of a form recognized by the registered form generating unit 35 on the display unit 12 as a new registered form.

The logical structure recognizing unit 32 extracts registered form data representing logical elements on the registered form acquired on the basis of the logical structure stored in the generic logical structure DB 22, pieces of position information of the logical elements, and a relation between the logical elements in association with various forms stored in the registered form DB 21, and stores the registered form data in the registered form data DB 23. With respect to the input form accepted through the input accepting unit 11, on the basis of the logical structure stored in the generic logical structure DB 22, the logical structure recognizing unit 32 extracts input form data representing the logical elements on the input form, pieces of position information of the logical elements, and the relation between the logical elements, and outputs the input form data to the logical structure collating unit 33 (described later).

For example, with respect to the registered form stored in the registered form DB 21 as shown in FIG. 3, the logical structure recognizing unit 32, on the basis of the logical structure "logical element number, logical element name, superordinate header, character string number, character string, relation to superordinate header" stored in the generic logical structure DB 22, extracts a registered form data representing the logical elements on the registered form, (b) pieces of position information of the logical elements, and (c) a relation between the logical elements as shown in FIG. 5, and stores the registered form data in the registered form data DB 23. In this case, an evaluation value or the like may be associated with the data on the basis of a creation date. Similarly, when the input form as shown in FIG. 2 is accepted by the input accepting unit 11, the logical structure recognizing unit 32, on the basis of the logical structure "logical element number, logical element name, superordinate header, character string number, character string, relation to superordinate header" stored in the generic logical structure DB 22, extracts input form data representing (a) the logical elements on the input form, (b) pieces of position information of the logical elements, and (c) a relation between the logical elements as shown in FIG. 6, and outputs the input form data to the logical structure collating unit 33 (described later). FIG. 6 is a diagram showing examples of a correct logical structure extracted from the input form and a recognized logical structure. Since information to be extracted and information stored as a registered form have the same contents, a form is selected by using contents to be extracted, and a data region is corrected. At the same time, a registered form can be easily newly formed. In this case, it is assumed that, due to a character error, a logical structure recognition error, or the like caused by an OCR, as a header and data of a logical element "creation date" to be essentially extracted, another date on the form is extracted.

The logical structure collating unit 33 compares the input form data extracted by the logical structure recognizing unit 32 with all the registered form data stored in the registered form data DB 23. More specifically, for example, a result obtained by comparing all the registered form data (see FIG. 5) stored in the registered form data DB 23 with the input form data (see FIG. 6) extracted by the logical structure recognizing unit 32 is output to the optimum registered form selecting unit 34.

More specifically, when the logical structure collating unit 33 assumes that M registered forms are present and that N logical elements are present, a position of "j" when viewed from the logical element "i" is given by $(x\_ij, y\_ij)$. Matrix nodes "i" and "j" in FIG. 5 are connected to each other when a result obtained by comparing a position $(x\_ij(in), y\_ij(in))$ of the input form data with a position $(x\_ij(m), y\_ij(m))$ of registered form data m (<M) is a predetermined threshold value or less. Logical elements of the registered form are sequentially arranged at peaks of the graph, and two logical elements having the same positional relation as that of the input form are connected to each other by a line. Whether the relations between the two logical elements are equal to each other is checked as follows. For example, a sum of squares "$J=(x\_ij(in)-x\_ij(m))^2+(y\_ij(in)-y\_ij(m))^2$" of a distance is calculated and subjected to a threshold process, and the two logical elements having values which are equal to or smaller than a threshold value have the same positional relations. This process is performed on the registered forms, so that similarity between the registered form and the input form is expressed by the number of lines on the graph. The logical structure collating unit 33 extracts a maximum partial graph (clique) in which the graphs obtained as described above are all connected to each other, and the number of logical elements which is the peak of the maximum partial graph is calculated as an evaluation value, so that the number (Cm) of the logical elements, in each of which input form data corresponds to registered form data m, is calculated.

When form images are collected by, for example, a scanner input, as the numerical values, coordinate values are divided by a DPI (dot per inch) value which determines the size of a form and an image size, standardized, and used, so that the same forms can be handled as the forms having the same sizes independently of the image sizes.

The optimum registered form selecting unit 34, on the basis of input form data extracted by the logical structure recognizing unit 32, specifies registered form data similar to the input form data in the registered form data DB 23, by a collating result of the logical structure collating unit 33. More specifically, for example, the optimum registered form selecting unit 34 acquires registered form data "m" having the maximum value in an evaluation value "Cm" obtained by executing the logical structure collating unit 33 on all the registered form data from the registered form data DB 23, and outputs the registered form data to the registered form generating unit 35. In this case, as an amount obtained by weighting "Cm" depending on a time period over which of a form to be used, a time stamp "Tm" of the final time at which the registered form data "m" is to be collated is used, and "Dm" given by "Dm=Cm/(T−Tm)" may be used as the evaluation value. "T" represents the present time here.

The registered form generating unit 35, on the basis of pieces of position information of the logical elements of a registered form data similar to input form data specified (selected) by the optimum registered form selecting unit 34, and a relation between the logical elements, re-extracts the input form data from the input form, extracts a logical element which cannot be re-extracted from the input form data, and generates the re-extracted input form data as new registered form data. More specifically, for example, the registered form generating unit 35, on the basis of position information of the logical element of the registered form data "m" having the maximum value "Cm" specified (selected) by the optimum registered form selecting unit 34 and the relation between the logical elements, re-extracts input form data from the input form, extracts a logical element which cannot be re-extracted from the input form data, generates a logical structure of the extracted input form and data of a region as new registered form data, and stores the logical structure and the region data in the registered form data DB 23.

Figure 7:
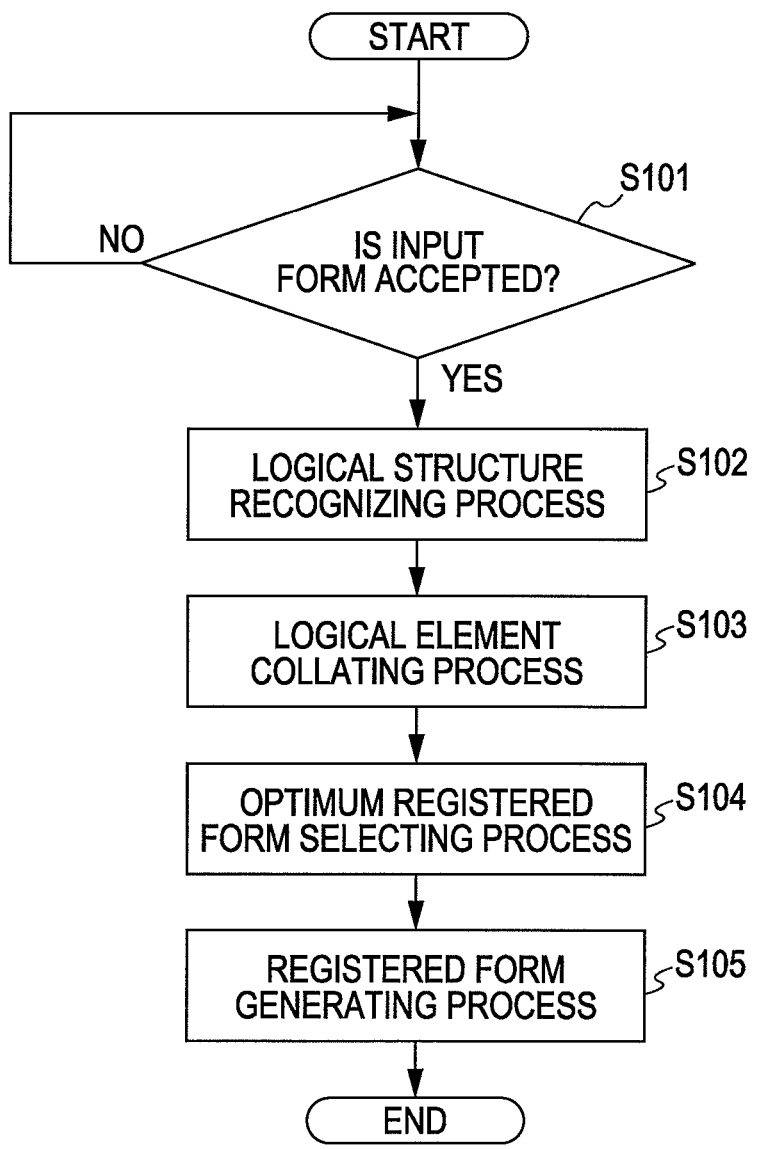
FIG. 7 is a flow chart showing a flow of an overall process in the form data extracting apparatus according to the first embodiment.

A process performed by the form data extracting apparatus will be described below with reference to FIGS. 7 to 18. First, a flow of an overall process in the form data extracting apparatus will be described with reference to FIG. 7. FIG. 7 is a flow chart showing a flow of an overall process in the form data extracting apparatus according to the first embodiment.

As shown in FIG. 7, when an input form is accepted by the input accepting unit 11 (YES in step S101), the form data extracting apparatus 10 determines a type of the accepted input form, and performs a logical structure recognizing process which extracts input form data, which is the logical structure of the input form according to the logical structure of the data stored in the generic logical structure DB 22 (step S102). The logical structure recognizing process of the registered form may be executed in advance according to the logical structure stored in the generic logical structure DB 22, and stored in the registered form data DB 23, or it may be executed when the input form is accepted by the input accepting unit 11 and stored in the registered form data DB 23.

Subsequently, the form data extracting apparatus 10 executes a logical element collating process which compares the extracted input form data with all the registered form data stored in the registered form data DB 23 (step S103), and, by using a logical element collating process result, executes an optimum registered form selecting process which specifies registered form data similar to the input form data from the registered form data DB 23 (step S104).

Thereafter, the form data extracting apparatus 10, on the basis of pieces of position information of logical elements of registered form data similar to the input form data specified (selected) by the optimum registered form selecting unit 34 and a relation between the logical elements, executes a registered form generating process which re-extracts input form data from the input form, extracts a logical element which cannot be re-extracted from the input form data, and generates the re-extracted input form data as new registered form data (step S105).

Figure 8:
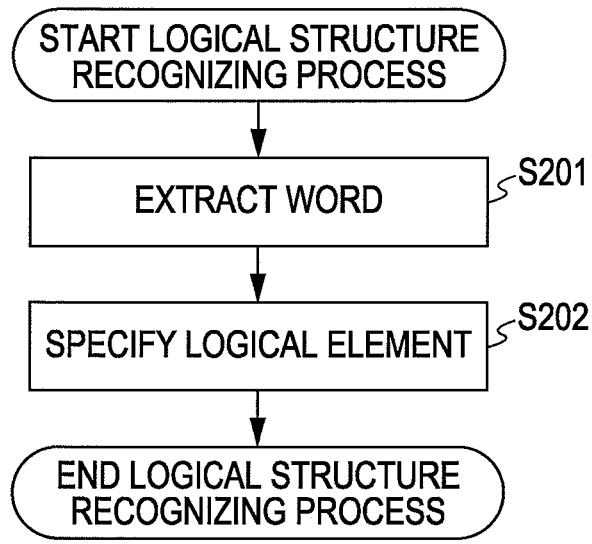
FIG. 8 is a flow chart showing a flow of a logical structure recognizing process in the form data extracting apparatus according to the first embodiment.

A logical structure recognizing process will be described below with reference to FIG. 8. FIG. 8 is a flow chart showing a flow of the logical structure recognizing process in the form data extracting apparatus according to the first embodiment.

As shown in FIG. 8, the logical structure recognizing unit 32 of the form data extracting apparatus 10 acquires a logical structure from the generic logical structure DB 22, and performs character recognition and table recognition to a form image of an input form (step S201). Thereafter, logical elements described in an acquired logical structure are associated with character strings in the input form, and are output to the logical structure collating unit 33 (step S202).

As a general method of character extraction or logical structure recognition, the logical structure recognizing unit 32 obtains a set of character string candidates of the logical elements on the input form by word extraction or the like. Thereafter, the logical structure recognizing unit 32, by using the logical structure (relation between the logical elements or relation between the logical elements on a layout) stored in the generic logical structure DB 22, allocates word candidates obtained by the word extraction to the logical elements, respectively. Thereafter, the logical structure recognizing unit 32 executes the logical structure recognition to identify character strings on an input form image corresponding to the logical elements, and can obtain the logical elements, the corresponding character strings on the form, and position coordinates of the character strings.

Figure 9:
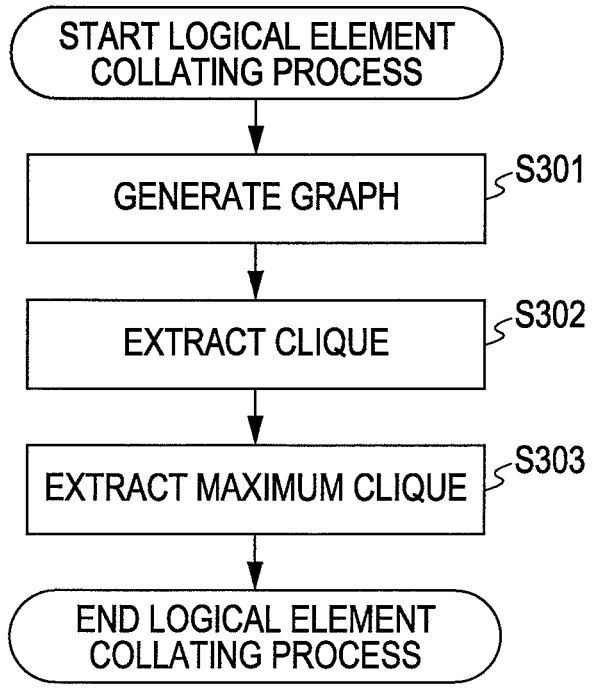
FIG. 9 is a flow chart showing a flow of a logical element collating process in the form data extracting apparatus according to the first embodiment.

A logical element collating process and an optimum registered form selecting process will be described below with reference to FIGS. 9 to 12. FIG. 9 is a flow chart showing a flow of the logical element collating process in the form data extracting apparatus according to the first embodiment.

As shown in FIG. 9, the logical structure collating unit 33 executes a graph generating process by using the input form data extracted by the logical structure recognizing unit 32, to extract a relation between the logical elements of the input form data (step S301).

Figure 10:
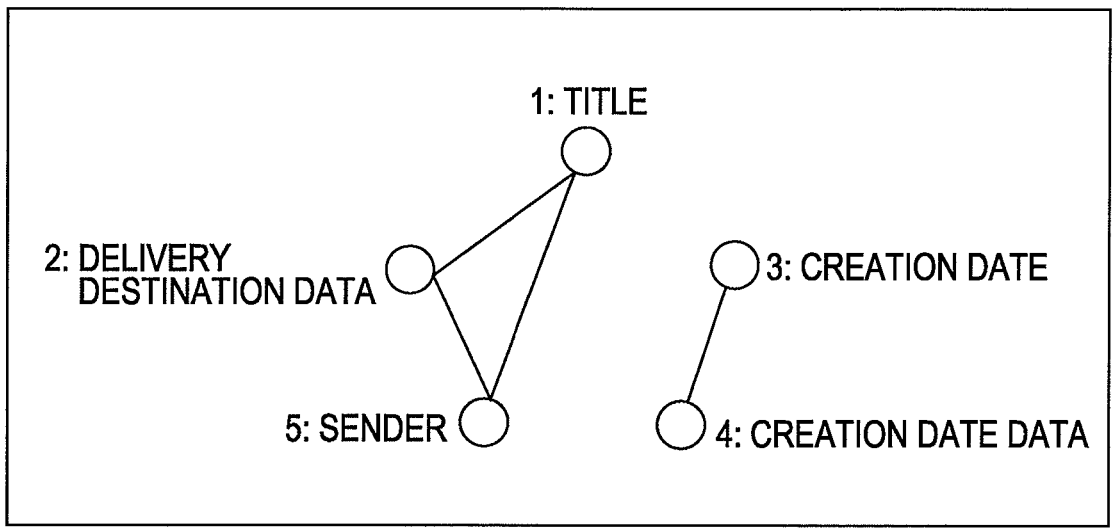
FIG. 10 is a diagram showing an example of a graph to be calculated.

More specifically, the logical structure collating unit 33, as shown in FIG. 10, numbers the logical elements described in the generic logical structure DB 22, defines the logical elements as nodes, and performs graph generation in which, when a relation between two logical elements "i, j" is a threshold value or less in the input form data and the registered form data of the registered form "m", connects nodes "i, j" to each other. FIG. 10 is a diagram showing an example of the calculated graph.

The logical structure collating unit 33 performs a clique process which connects logical elements having the same positional relation with reference to the formed graph (step S302), and the optimum registered form selecting unit 34 selects the maximum clique in which a maximum number of logical elements are connected to each other from the formed clique (step S303). With respect to extraction of the maximum clique, a document is given.

Figure 11:
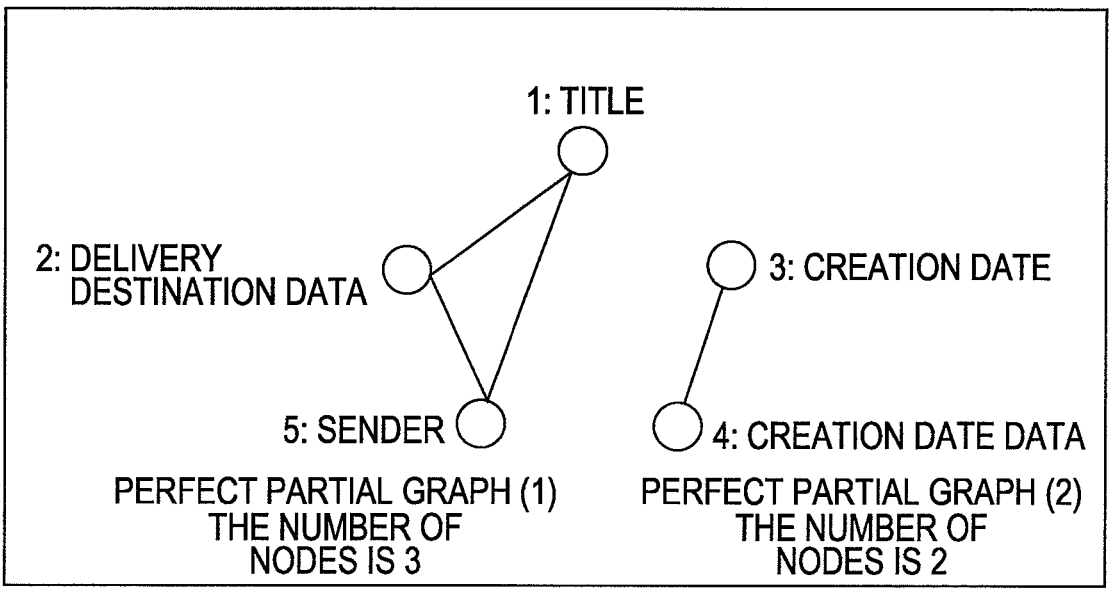
FIG. 11 is a diagram showing an example of a clique to be formed.
Figure 12:
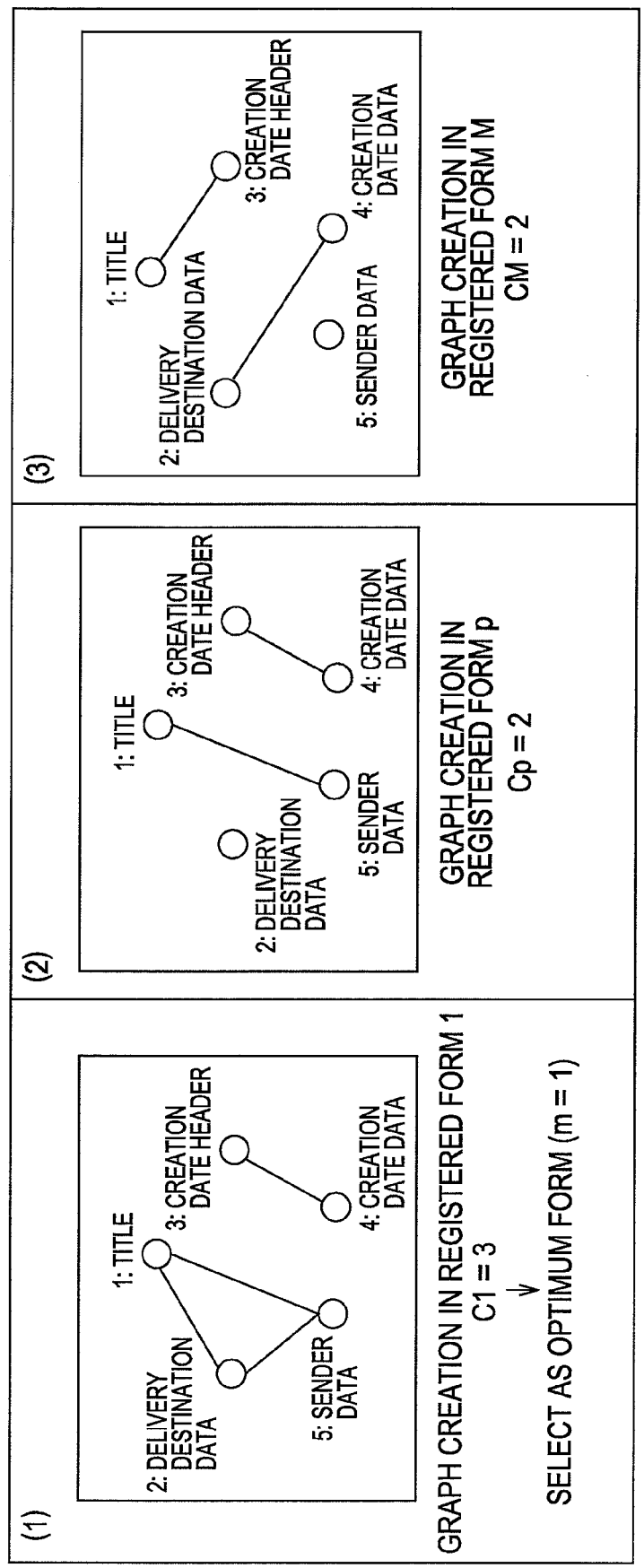
FIG. 12 is a diagram showing a selected example of a maximum clique.

More specifically, when the logical structure collating unit 33 performs the clique process which connects the logical elements having the same positional relation with reference to the formed graph, as shown in FIG. 11, the logical structure collating unit 33 acquires a clique result including two perfect partial graphs, i.e., a perfect partial graph having three nodes and a perfect partial graph having two nodes with respect to the combination of the input image and one registered form. In this case, since the perfect partial graph expresses "the number of logical elements having the same positional relation", the maximum value of the number is a set of logical elements in two forms which are most similar to each other. Although a plurality of perfect partial graphs are obtained for one registered form, in this case, 3 is a perfect partial graph (maximum clique) having the maximum size in these perfect partial graphs. Accordingly, 3 is defined as the degree of similarity to the registered form. The above process is performed on all the registered forms. As shown in FIG. 12, the perfect partial graph having the three nodes is defined as the one with a degree of similarity "Cm=3" for the input form data of the registered form data "m", and the m which gives the maximum value to the degree of similarity "Cm" to all the registered forms is extracted and output to the optimum registered form selecting unit 34. FIG. 11 is a diagram showing an example of a clique to be formed, and FIG. 12 is a diagram showing a selected example of the maximum clique.

Figure 13:
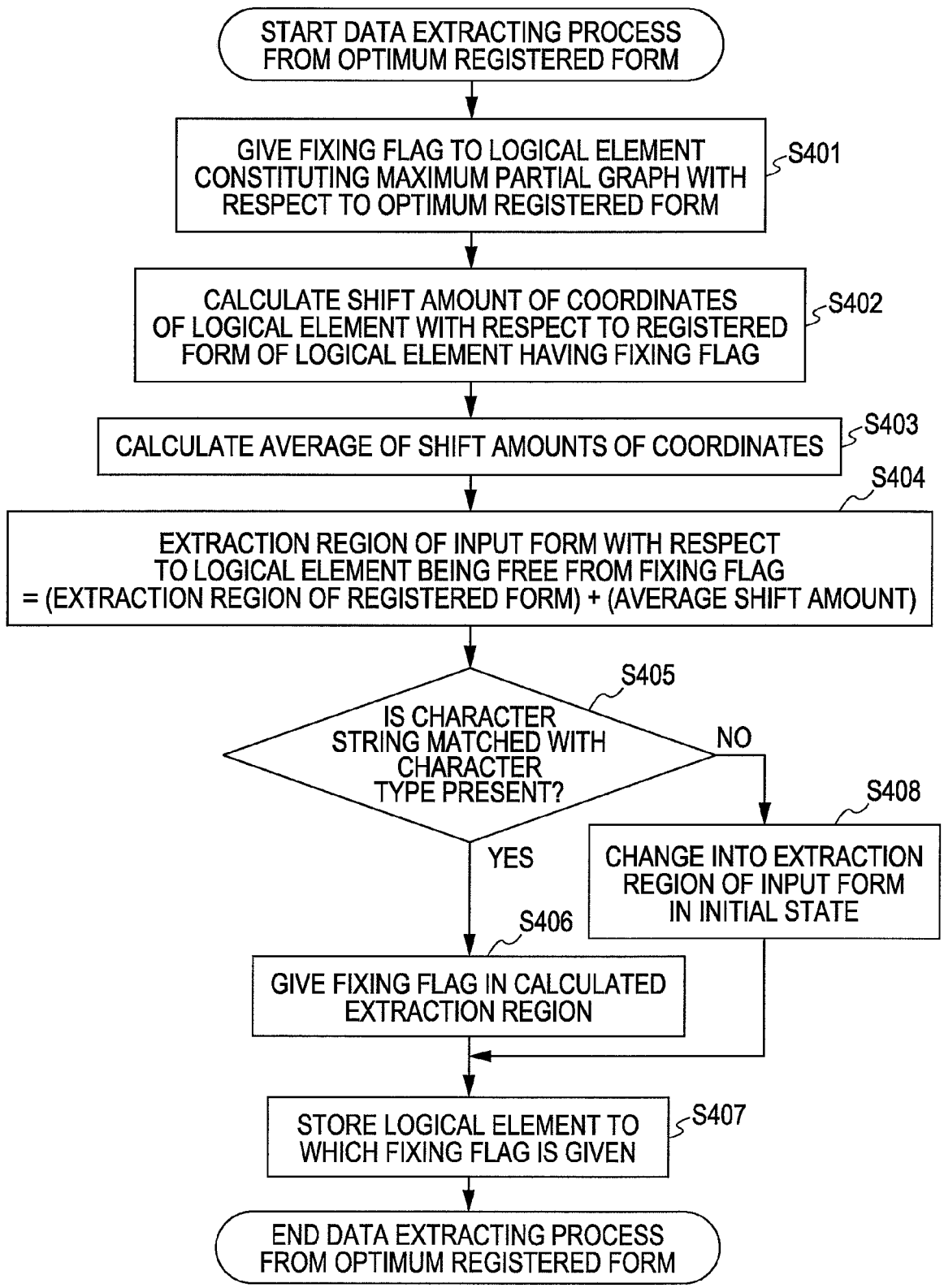
FIG. 13 is a flow chart showing a flow of a data extracting process from an optimum registered form in the form data extracting apparatus according to the first embodiment.

A data extracting process will be described below with reference to FIGS. 13 to 18. FIG. 13 is a flow chart showing a flow of the data extracting process from an optimum registered form in the form data extracting apparatus according to the first embodiment.

As shown in FIG. 13, it is assumed that the registered form generating unit 35 gives a fixing flag to a logical element constituting a maximum partial graph on the basis of registered form data having a degree of similarity "Cm=3" selected by the optimum registered form selecting unit 34, i.e., uses a fixing flag of an input image to a logical element serving as a peak of a perfect partial graph which gives the degree of similarity "Cm=3", and stores the logical element as a determination element (step S401).

Figure 14:
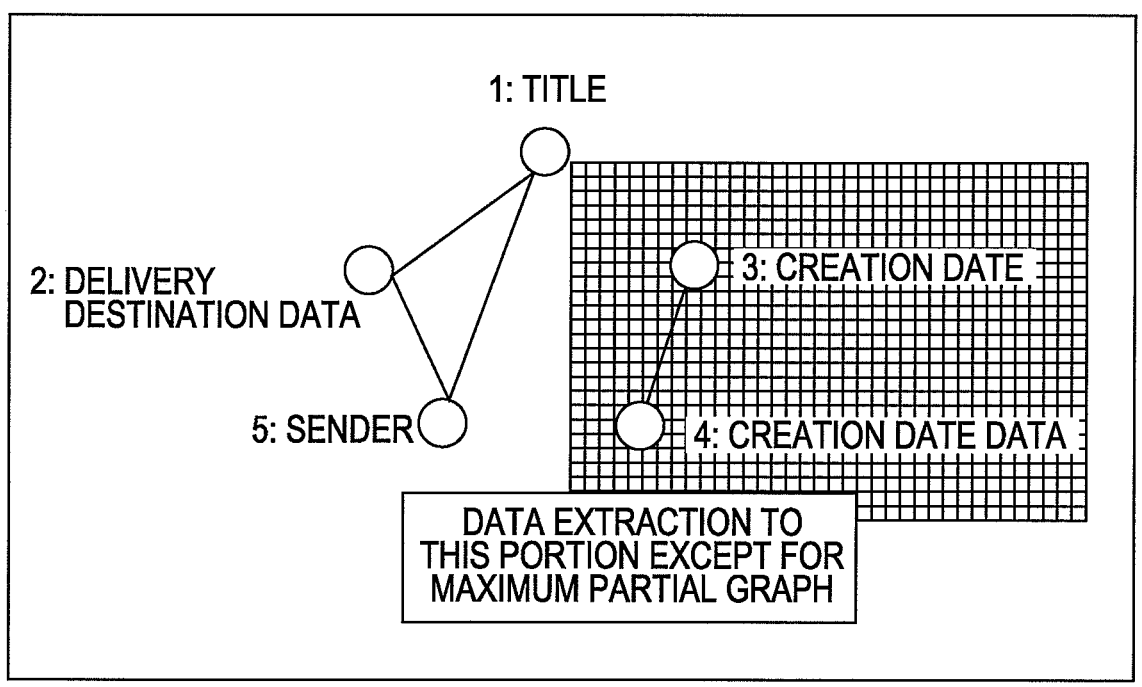
FIG. 14 is a diagram showing a determining example of a data re-extracted item.

More specifically, for example, the registered form generating unit 35, as shown in FIG. 14, describes "1. title, 2. delivery destination data, 5. sender header" as determination elements in an entire graph of the registered form data selected by the optimum registered form selecting unit 34 and having the degree of similarity "Cm=3", and gives the fixed flag to these logical elements. More specifically, with respect to the subtracted "1. title, 2. delivery destination data, 5. sender header", data can be extracted from the registered form data. Data re-extraction must be performed to "3. creation date header, 4. creation date data" except for this portion. FIG. 14 is a diagram showing a determination example of a data re-extraction item. A logical element to which the fixing flag is not given is defined as a re-extracted item.

Subsequently, the registered form generating unit 35 calculates shift amounts of coordinates of logical elements of registered form data and input form data in the maximum partial graph stored in the registered form data DB 23 (step S402), and calculates an average of the shift amounts of the calculated coordinates (step S403). Thereafter, the registered form generating unit 35 defines a region obtained by adding the calculated average shift amount to a data extraction region of the registered form as a data extraction region of the input form to a logical element which is free from a fixing flag (step S404), and re-extracts data (character type). When a character string corresponding to the data (character type) is present (YES in step S405), a fixing flag has been given in the calculated extraction region (step S406), and a logical element to which the fixing flag is given is stored (step S407).

On the other hand, when no character string corresponding to the data (character type) is present (NO in step S405), the extraction region is changed into an extraction region of an input form in an initial state (step S408), and the logical element to which the fixing flag has been given is stored (step S407). A shift of coordinates supposed here is used to cancel out unevenness occurring for every scanning such as left and right margins and upper and lower margins which occur when paper is scanned.

More specifically, for example, since a shift between the coordinates of the logical elements of the registered form data (see FIG. 5) and the input form data (see FIG. 6) in the perfect partial graph stored in the registered form data DB 23 can be calculated, i.e., since "title, delivery destination data, delivery destination header" on the registered form shown in FIG. 15 can be extracted from the input form shown in FIG. 16, differences between coordinates of the "title, delivery destination data, delivery destination header" on the registered form and coordinates of "title, delivery destination data, delivery destination header" on the input form do not constitute a perfect partial graph, coordinates on the input form of logical elements "creation date header, creation date data" to be re-extracted can be calculated by the registered form generating unit 35. As a result of logical structure recognition to the input form shown in FIG. 17, a shift amount 5 between registered forms at the coordinates of "title", "delivery destination data", and "sender data" constituting the perfect partial graph can be calculated.

The registered form generating unit 35 adds the calculated shift to coordinates of the re-extracted logical elements "creation date header, creation date data" in the registered form data and extracts "creation date header, creation date data" from the added region on the input form, so that the registered form generating unit 35 performs character recognition at positions where "creation date header, delivery date, (35, 100-85, 120), (55, 110)" and "creation date data, Jun. 1, 2007, (85, 120-135, 140), (110, 130)", which are results of logical recognition when the input form shown in FIG. 17 is accepted, are replaced with "creation date data, date, (105, 10-145, 30), (125, 20)" and "creation date, Apr. 1, 2007, (155, 10-215, 30), (185, 20)" obtained by adding a shift amount of 5 to the coordinates of the registered form as shown in FIG. 18, respectively. When a necessary character string is present, data can be formed. In this case, since character types can be designated to only a number or a specific character in a target region and recognized, accuracy of character recognition by an OCR is also improved. FIG. 15 is a diagram showing an example of a registered form, and FIG. 16 is a diagram showing an example of an input form, and is a diagram in which a character string having a creation date header and creation date data which are different from correct ones, respectively, is extracted as a logical element. FIG. 17 is a diagram showing an example of a result of logical structure recognition when an input form is accepted. FIG. 18 is a diagram showing an example in which data is re-extracted by using coordinates of logical elements of an optimum registered form.

As described above, according to the first embodiment, in association with various forms stored in the registered form DB 21, registered form data representing logical elements on the registered form acquired on the basis of a logical structure stored in the generic logical structure DB 22, pieces of position information of the logical elements, and a relation between the logical elements is stored, to the input form, on the basis of the logical structure stored in the generic logical structure DB 22, input form data representing the logical elements on the input form, pieces of position information of the logical elements, and a relation between the logical elements is extracted, on the basis of the extracted input form data, registered form data similar to the input form data is specified in the registered form data DB 23, on the basis of pieces of position information of logical elements of the registered form data similar to the specified input form data and a relation between the logical elements, the input form data is re-extracted from the input form, a logical element which cannot be re-extracted is extracted from the input form data, and the re-extracted input form data is generated as new registered form data. For this reason, data can be easily extracted even in a form which is not registered in advance, and a new registered form can be easily formed.

According to the first embodiment, when the input form corresponds to the registered form, information of the registered form is additionally used, and positions of a header and data are corrected. However, even though the input form is not included in the registered form, a logical structure recognition result can be output as a data extraction result. In addition, since information of a header and data necessary for extraction is defined as information of the registered form, the information can also be used in a form which does not have information such as ruled lines and symbols which are unnecessary for extraction.

According to the first embodiment, with respect to each of the logical elements of the registered form data, an evaluation value representing weighting by time and date at which the logical element is extracted is stored. On the basis of the extracted input form data and the evaluation value of the logical elements of the registered form data, registered form data similar to the extracted input form data is specified in the registered form data DB 23. For this reason, even though the registered form includes a large number of forms which are not used at the present, registered forms can be selected from the form used at the present by using the time at which the last identification was performed by each of the registered forms.

According to the first embodiment, four apexes of a circumscribed rectangle of each of the logical elements in the extracted input form data are compared with four apexes of a circumscribed rectangle of each of the logical elements in the registered form data stored in the registered form data DB 23, so that a specific logical element in the input form data corresponding to each of the logical elements in the registered form data is determined to specify the registered form data similar to the input form data in the registered form data DB 23. For this reason, a height or a width of a region which cannot be easily read by only a center of gravity are evaluated, so that optimum registered form data and secondary form registered form data can be more accurately specified.

Second Embodiment

According to the present invention, when proper data cannot be extracted by the data extracting method according to the first embodiment, for example, when data does not matched with a designated character type, a registered form which is perfectly matched with an input form may not be present. In this case, a plurality of other registered forms which are partially similar to the input form are prepared, so that data extraction can still be performed.

Therefore, the second embodiment describes an example in which, when some data cannot be extracted from registered form data which is defined to be similar to the input form data, another form (secondary registered form) partially similar to the input form is further used to perform data extraction.

Figure 19:
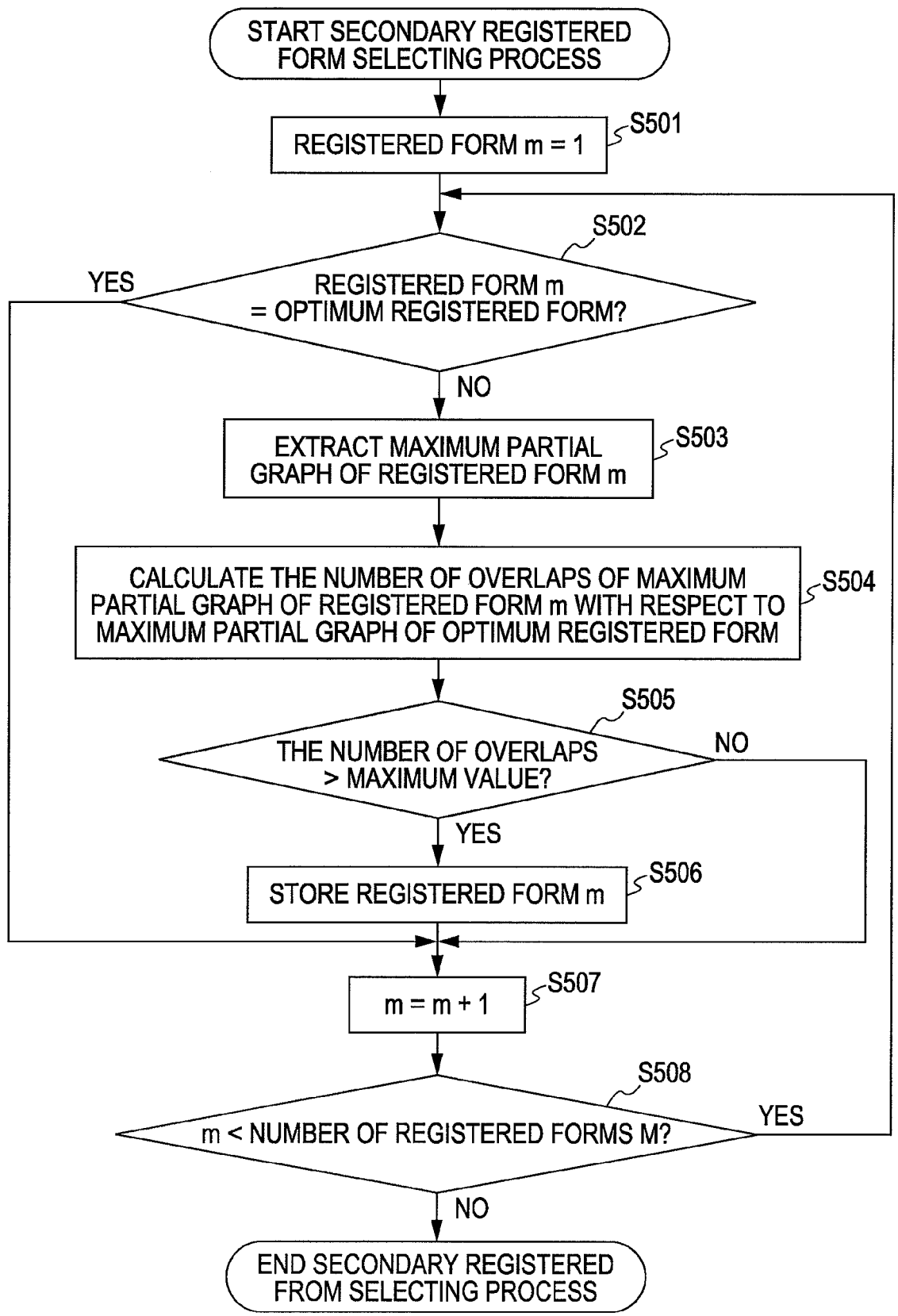
FIG. 19 is a flow chart showing a flow of a secondary registered form selecting process in a form data extracting apparatus according to a second embodiment.

A flow of a secondary registered form selecting process will be described below with reference to FIGS. 19 to 23. FIG. 19 is a flow chart showing a flow of the secondary registered form selecting process in a form data extracting apparatus according to the second embodiment.

As shown in FIG. 19, a logical structure collating unit 33 of a form data extracting apparatus 10 sets a variable "m (=1)" to sequentially refer to registered form data stored in the registered form data DB 23 (step S501), and determines whether the registered form data of the variable "m (=1)" is a form specified as an optimum registered form (step S502).

When the registered form data of the variable "m (=1)" is not a form specified as the optimum registered form (NO in step S502), the logical structure collating unit 33 performs extraction of a maximum partial graph of the registered form data of the variable "m (=1)" (step S503), and calculates the number of overlaps of the maximum partial graph of the registered form data of the variable "m (=1)" to the maximum partial graph of a registered form data specified as the optimum registered form (step S504).

Subsequently, the logical structure collating unit 33 determines whether the calculated number of overlaps is larger than the maximum value stored at the present (step S505). When the calculated number of overlaps is larger than the maximum value stored at the present (YES in step S505), the registered form data "m" having the number of overlaps is stored in a memory or the like (step S506), and "m" is incremented by "1" (step S507). When "m" is smaller than the number "M" of registration of registered form data stored in the registered form data DB 23 (YES in step S508), the processes in step S502 to step S508 are repeated.

On the other hand, when the registered form data of the variable "m (=1)" is a form specified as the optimum registered form (YES in step S502), or when the calculated number of overlaps is smaller than the maximum value stored at the present (NO in step S505), the logical structure collating unit 33 increments "m" by "1" (step S507). When "m" is smaller than the number "M" of registration of registered form data stored in the registered form data DB 23 (YES in step S508), the processes in step S502 to step S508 are repeated.

When "m" is larger than the number "M" of registration of registered form data stored in the registered form data DB 23 (NO in step S508), the logical structure collating unit 33 ends the processes.

More specifically, when an input form as shown in FIG. 20 is accepted to recognize a logical structure, the logical structure collating unit 33 selects a registered form as shown in FIG. 21 as an optimum registered form. At this time, the logical structure collating unit 33 can extract "title (estimation sheet), delivery destination data (B corporation), sender data (A corporation)" from the registered form (registered form data) shown in FIG. 21. However, "creation date header, creation date data" cannot be extracted because positional relations of "creation data header, creation date data" with reference to "sender data (A corporation)" in the registered form is different from that in the input form.

Figure 22:
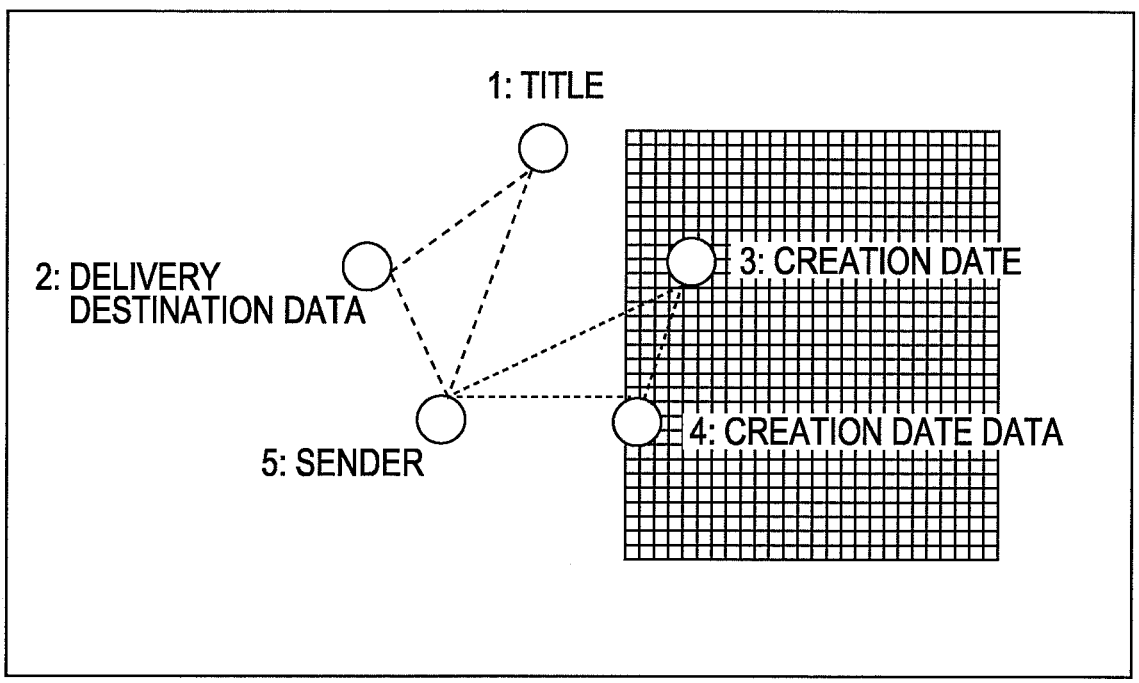
FIG. 22 is a diagram showing an example of an overlap between maximum graphs.

Therefore, the logical structure collating unit 33, as described above, calculates the number of overlaps "title (estimation sheet), delivery destination data (B corporation), sender data (A corporation)" between a maximum partial graph related to the registered form data of the variable "m" except for the optimum registered form, and a maximum partial graph of registered form data specified as the optimum registered form, and selects registered form data "m" having the value equal to or higher than a threshold value and a maximum value as a secondary registered form. At this time, a logical element which is determined by the optimum registered form and included in the maximum partial graph at this time is "delivery destination data (A corporation)", and a logical element which is not included in the optimum registered form is "creation date header, creation date data" having the same positional relation as that of "delivery destination data (A corporation)" (see FIG. 23). In this manner, a position of a logical element "creation date header, creation date data" which is not determined by the optimum registered form can be determined. FIG. 20 is a diagram showing an example of an input form, and FIG. 21 is a diagram showing an example of a selected optimum registered form. FIG. 22 is a diagram showing an example of an overlap between maximum graphs, and FIG. 23 is a diagram showing an example of a selected secondary registered form.

Figure 24:
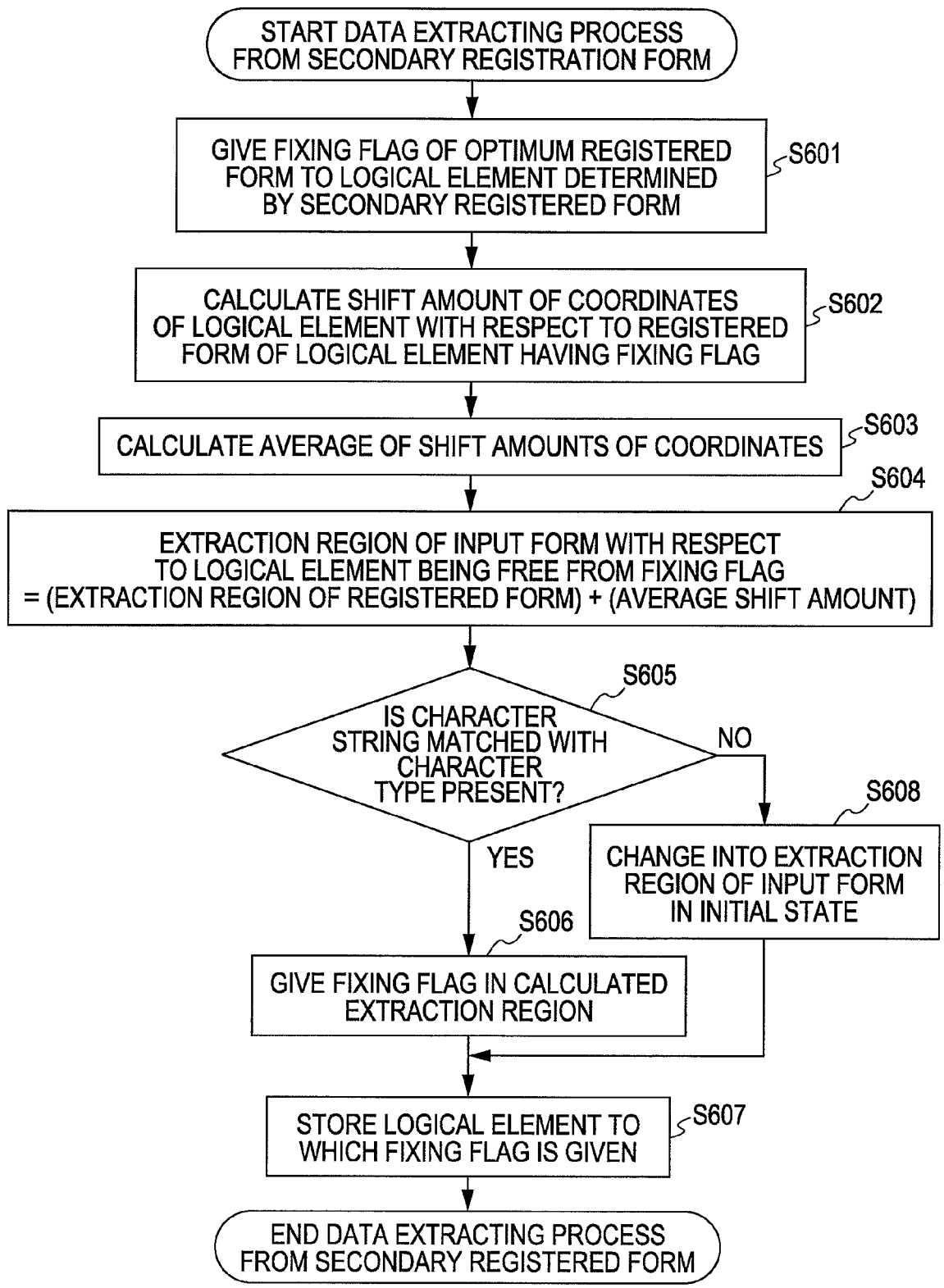
FIG. 24 is a flow chart showing a flow of secondary registered form data extraction in the form data extracting apparatus according to the second embodiment.

A flow of a secondary registered form data extracting process will be described below with reference to FIGS. 24 to 27. FIG. 24 is a flow chart showing a flow of secondary registered form data extraction in the form data extracting apparatus according to the second embodiment.

As shown in FIG. 24, the registered form generating unit 35 stores, as a determination element, an element of a maximum partial graph from an entire graph of secondary registered form data selected by the logical structure collating unit 33, and (a) gives a fixing flag (step S601), (b) calculates shift amounts between coordinates of overlapping logical elements in optimum registered forms in the secondary registered form data of a maximum partial graph stored in the registered form data DB 23 and input form data (step S602), and (c) calculates an average of shift amounts between the calculated coordinates (step S603).

Thereafter, the registered form generating unit 35 defines a region obtained by adding the calculated average shift amount to a data extraction region of a registered form as a data extraction region of an input form of a logical element determined by a secondary registered form (step S604), and re-extracts data (character type). When a character string corresponding to the data (character type) is present (YES in step S605), the registered form generating unit 35 gives a fixing flag in the calculated extraction region (step S606) and stores the logical element to which the fixing flag is given (step S607).

On the other hand, when the character string corresponding to the data (character type) is not present (NO in step S605), the region is changed into an extraction region of an input form in an initial state (step S608), and the logical element to which the fixing flag is given is stored (step S607). The shift between coordinates supposed here is used to cancel out unevenness occurring for every scanning such as left and right margins and upper and lower margins which occur when paper is scanned.

More specifically, the registered form generating unit 35, as described above, in secondary registered form data shown in FIG. 26 and selected to extract "title (estimation sheet), delivery destination data (B corporation), sender data (A corporation)" which cannot be extracted from the specified optimum registered form data shown in FIG. 25, extracts a shift between coordinates of a logical element "sender" matched with the optimum registered form data and the input form data and coordinates of the "sender data" in the input form data. The registered form generating unit 35 extracts "creation date header, creation date data" from the input form by using coordinates determined in consideration of the shift on the basis of the coordinates of the "creation date header, creation date data" of the secondary registered form data, and stores the "creation date header, creation date data" in input form data generated when the form data is input, so that an extraction result of the input form data as shown in FIG. 27 can be obtained. FIG. 25 is a diagram showing an example of an optimum registered form, FIG. 26 is a diagram showing an example of a secondary registered form, and FIG. 27 is a diagram showing an example of input form data which is finally extracted.

Effect by Second Embodiment

In this manner, according to the second embodiment, when a form specifying request which requests registered form data similar to input form data in addition to registered form data similar to input form data is received, then secondary registered form data similar to the input form data is specified in the registered form data except for the specified registered form data. On the basis of pieces of position information of the logical elements of registered form data similar to the specified input form data and a relation between the logical elements, the input form data is re-extracted from the input form. When a logical element which cannot be re-extracted from the input form is present, on the basis of pieces of position information of logical elements of secondary registered form data obtained by transmitting the form specifying request and a relation between the logical elements, the input form data is re-extracted from the input form, and the re-extracted input form data is generated as new registered form data. For this reason, when data cannot be extracted from registered form data which is most similar to the input form, data extraction can be performed by using the secondary registered form data. As a result, registered form data which reproduces the input form can be generated at high accuracy.

Third Embodiment

The second embodiment describes an example in which, when data cannot be extracted from an optimum registered form, registered form data (secondary registered form data) is selected again to extract input form data. However, the present invention is not limited to the second embodiment. When the input form data cannot be extracted, registered form data (nth-order registered form data) can be selected a predetermined number of times to make it possible to extract the input form data.

Therefore, a third embodiment describes an example in which, when input form data cannot be extracted, registered form data (nth-order registered form data) is selected a predetermined number of times to extract input form data.

Figure 28:
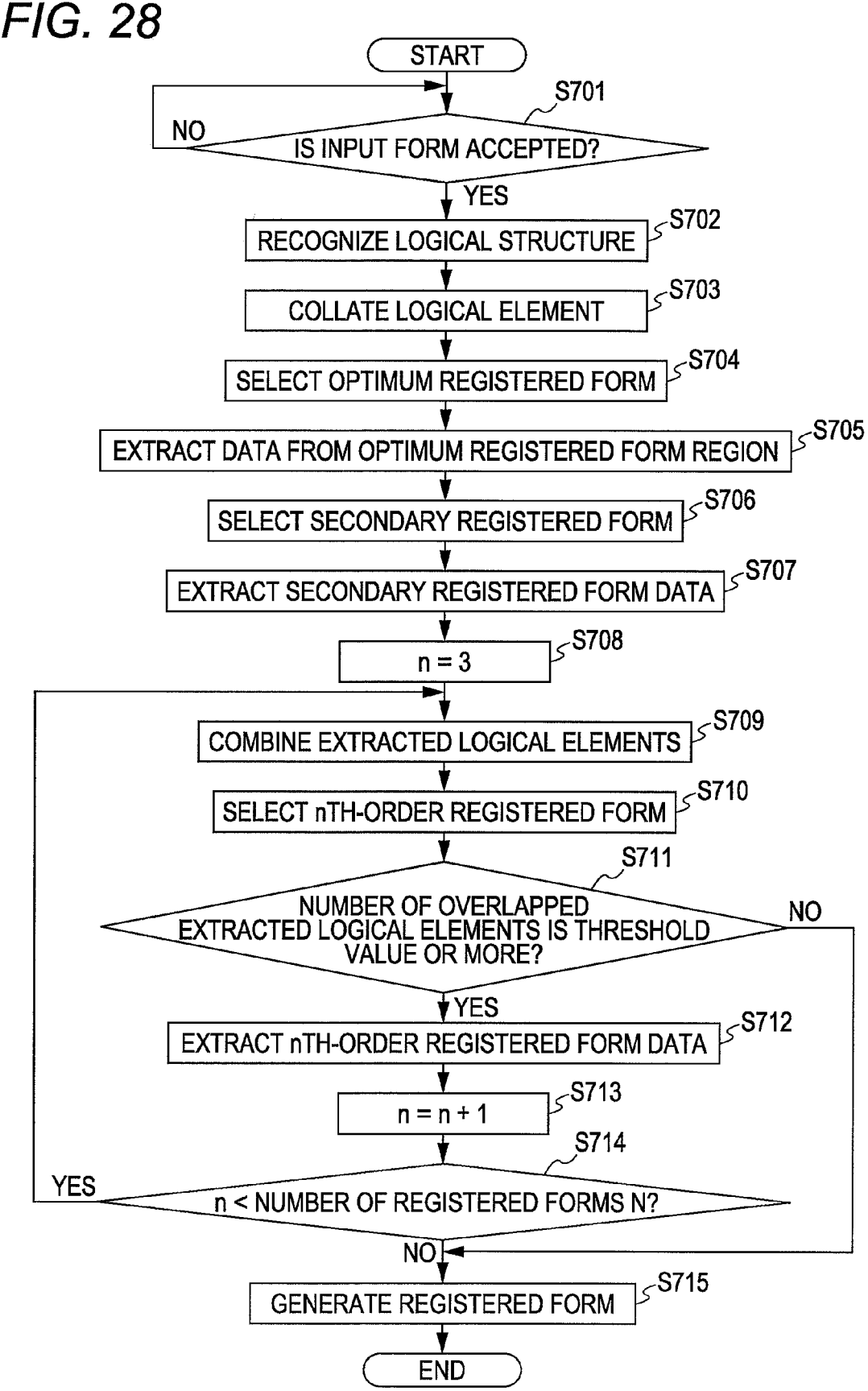
FIG. 28 is a flow chart showing a flow of processes of a form data extracting apparatus according to a third embodiment.

In the third embodiment, by using FIG. 28, a process of selecting registered form data (nth-order registered form data) a predetermined number of times and extracting input form data when input form data cannot be extracted is described. FIG. 28 is a flow chart showing a flow of processes of a form data extracting apparatus according to the third embodiment. Since the procedures in step S701 to step S707 in FIG. 28 are the same as the processes in FIG. 8, FIG. 9, and FIG. 13 described in the first embodiment and the processes in FIG. 19 and FIG. 24 described in the second embodiment, a detailed description of the processes are not repeated here. Step S708 to step S715, which are different from the processes in the first embodiment, and the second embodiment will be described below.

As shown in FIG. 28, upon completion of secondary registered form data extraction, a registered form generating unit 35 of a form data extracting apparatus 10 assigns "3" to a variable "n" (step S708), and combines logical elements which are extracted in advance (step S709).

Subsequently, the logical structure collating unit 33 selects registered form data (nth-order registered form data) similar to input form data from a registered form data DB 23 by the same method as in the first embodiment and the second embodiment (step S710), and determines whether the selected nth-order registered form data overlap the extracted logical elements, the number of which is a threshold value or more (step S711).

When the selected nth-order registered form data overlaps the extracted logical elements, the number of which is the threshold value or more (YES in step S711), the registered form generating unit 35 extracts data from the input form by the same method as that in the first embodiment or the second embodiment, using the selected nth-order registered form data (step S712), and "n" is incremented by "1" (step S713). When "n" is smaller than the number "N" of registered form data stored in the registered form data DB 23 (YES in step S714), the processes in the step S709 to the step S714 are repeated.

When the selected nth-order registered form data does not overlap the extracted logical elements, the number of which is the threshold value or more (NO in step S711), or when "n" is larger than the number "N" of registration of registered form data stored in the registered form data DB 23 (NO in step S714), the registered form generating unit 35 stores the input form data extracted by the method in the registered form data DB 23 as new registered form data (step S715), and ends the process.

In this manner, according to the third embodiment, each time the form specifying request is received, registered form data similar to input form data is specified in registered form data except for the specified registered form data, and, on the basis of pieces of position information of logical elements of the specified registered form data similar to the input form data and a relation between the logical elements, the input form data is re-extracted from the input form. When a logical element which cannot be re-extracted from the input form is present, after transmission of the form specifying request is repeated a predetermined number of times, the re-extracted input form data is generated as new registered form data. For this reason, registered form data which correctly reproduces an input form can be correctly generated.

Fourth Embodiment

The embodiments according to the present invention have been described above. However, the present invention may be executed in various other configurations. Therefore, as will be described below, different embodiments will be described below such that the embodiments are separated into (1) a data extracting method, (2) a similar registered form data specifying method, (3) a system configuration or the like, and (4) a program.

(1) Date Extracting Method

For example, according to the present invention, in a plurality of regions of extracted input form data, a plurality of registered form data having regions which are matched with only the regions specified in a registered form data DB 23, on the basis of pieces of position information of logical elements of the plurality of specified registered form data. A relation between the logical elements, a plurality of input form data are re-extracted from an input form, and the plurality of re-extracted input form data can be combined with each other to generate the input form data as new registered form data.

Figure 32:
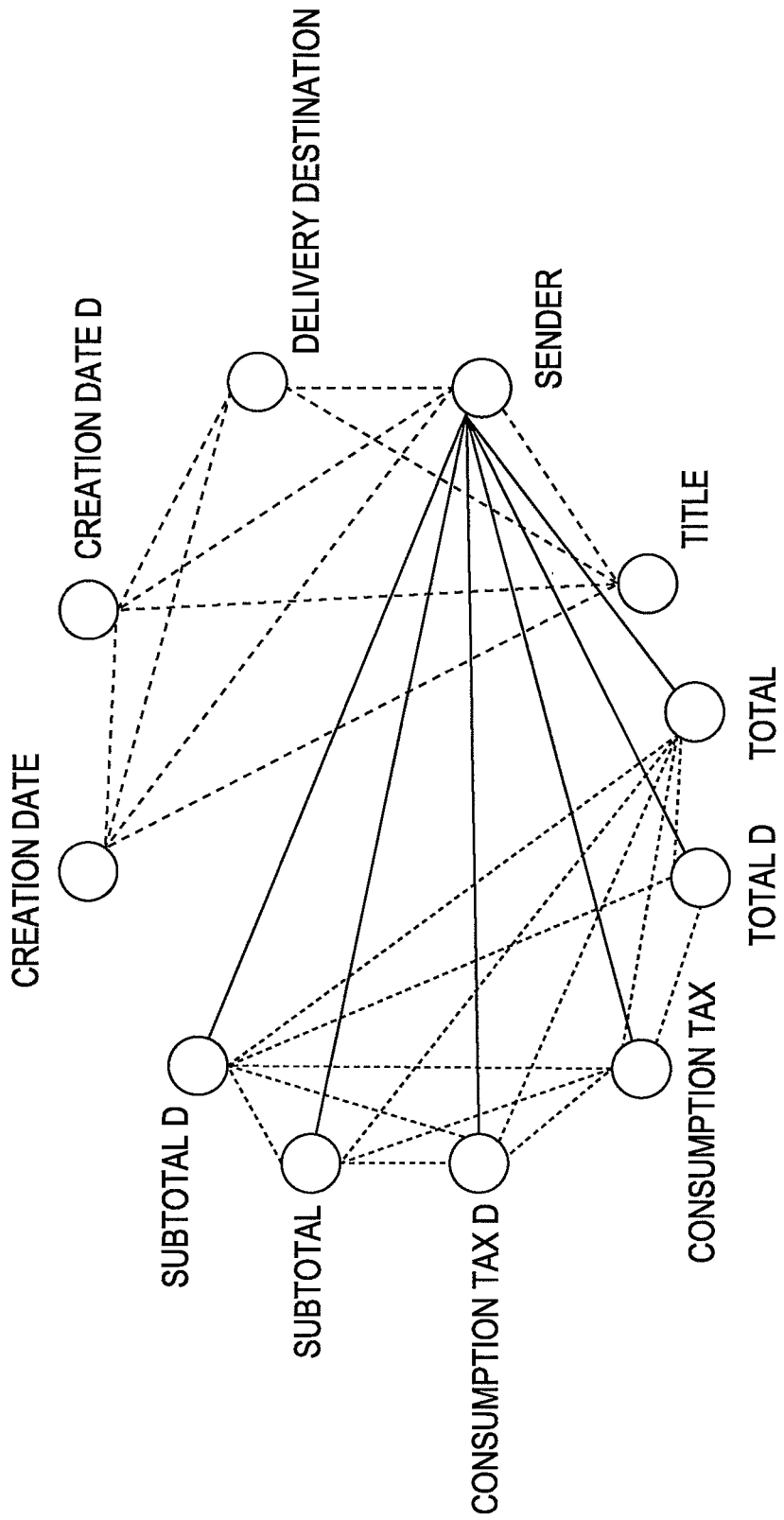
FIG. 32 is a diagram showing an example of a result obtained by performing a graph process by using a plurality of registered form data.

For example, when an input form as shown in FIG. 29 is input, the form data extracting apparatus 10 divides the input form shown in FIG. 29 into upper, center, and lower regions. The form data extracting apparatus 10 specifies a registered form 1 (registered form data 1) having a portion which is matched with an upper center portion of an input form as shown in FIG. 30, and a registered form 2 (registered form data 2) having a portion which is matched with a lower center portion of the input form, as shown in FIG. 31 in the registered form data DB 23. The registered form 1 and the registered form 2 are subjected to the graph process described in the first embodiment or the like to generate a graph as shown in FIG. 32. The form data extracting apparatus 10 re-extracts data from the input form by using region information (coordinates) which is matched with the registered form data 1 and the registered form data 2, and the plurality of re-extracted input form data are combined with each other to generate the input form data as new registered form data. FIG. 29 is a diagram showing an example of the input form, and FIG. 30 is a diagram showing a registered form having a portion which is matched with an upper center portion of the input form. FIG. 31 is a diagram showing a registered form having a portion which is matched with a lower center portion of the input form, and FIG. 32 is a diagram showing an example of a result obtained by performing a graph process by using a plurality of registered form data.

(2) Similar Registered Form Data Specifying Method

In the present invention, in addition to comparison between four apexes of a circumscribed rectangle of each logical element in an extracted input form data, and four apexes of a circumscribed rectangle of each logical element in registered form data stored in the registered form data DB 23, a center of gravity of the logical elements in the extracted input form data and a center of gravity of the registered form data stored in the registered form data DB 23 are compared with each other to determine a specific logical element in the input form data corresponding to each logical element in the registered form data, so that registered form data similar to the input form data can be specified in the registered form data DB 23.

(3) System Configuration or the Like

The constituent elements of the shown apparatuses are not always required to be physically configured as shown in the drawings. More specifically, concrete configurations of distribution and integration of the apparatuses are not limited to the configurations shown in the drawings. All or some of the apparatuses can be configured to be functionally or physically distributed and integrated in arbitrary units depending on various loads or statuses of use. Furthermore, all or some process functions performed in the apparatuses can be realized by a CPU and a program which can be analyzed and executed by the CPU or realized as hardware obtained by wired logic.

Of the processes described in the embodiments, all or some of the processes described as automatically executed processes can also be manually executed. Alternatively, all or some of the processes described as manually executed processes can also be automatically executed by a known method. In addition, the process procedures, the control procedures, the concrete names, and information including various data or parameters which are described in the specification and the drawings can be arbitrarily changed unless otherwise noted.

(4) Program

The various processes described in the embodiments can be realized by executing a prepared program in a computer system such as a personal computer or a workstation. Therefore, a computer system which executes a program having the same functions as those of the embodiments will be described below as another embodiment.

Figure 33:
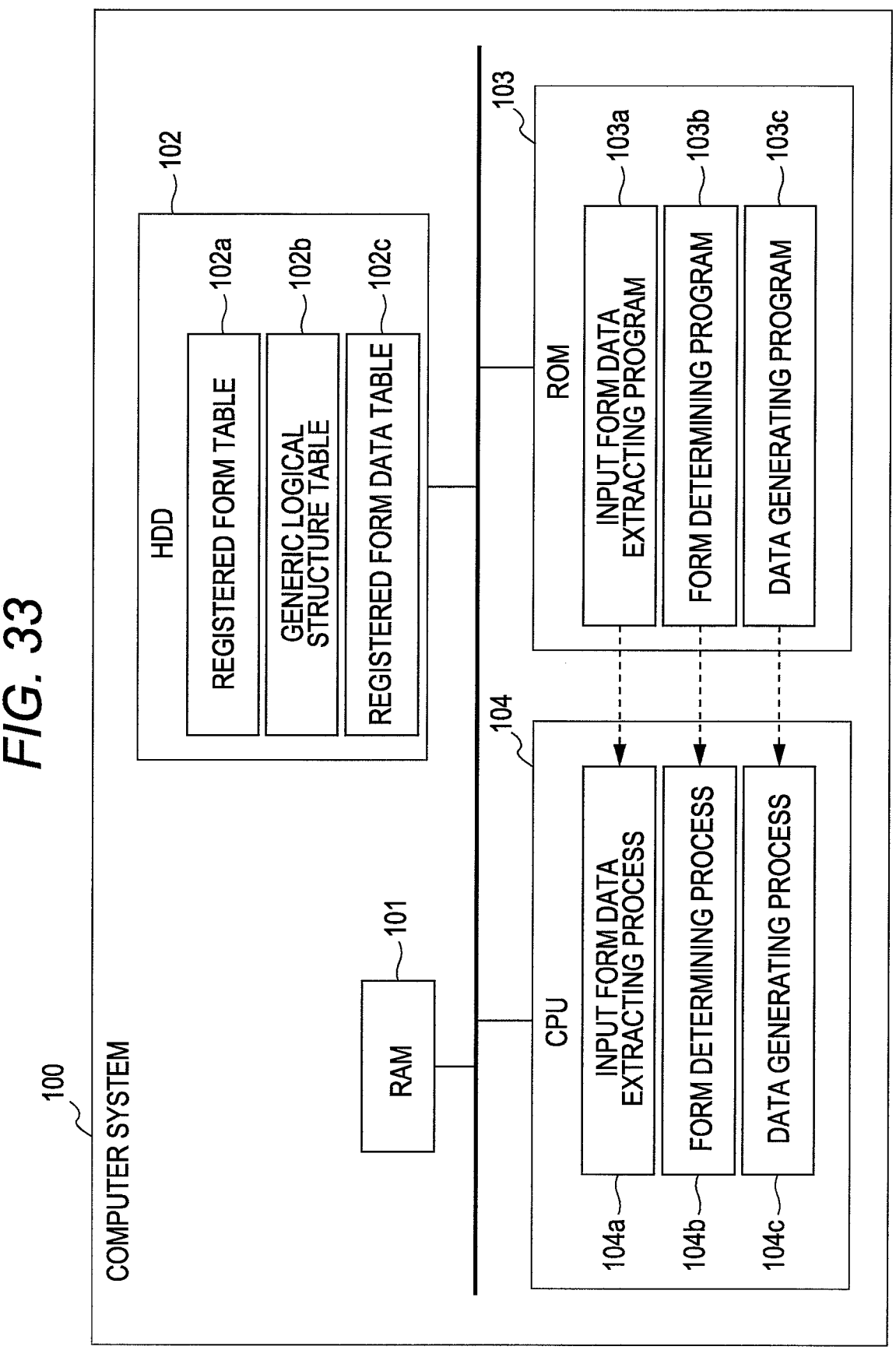
FIG. 33 is a diagram showing an example of a computer system which executes a form data extracting program.

FIG. 33 is a diagram showing an example of a computer system which executes a form data extracting program. As shown in FIG. 33, a computer system 100 includes a RAM 101, an HDD 102, a ROM 103, and a CPU 104. In this case, in the ROM 103, programs having the same functions as those in the embodiments, i.e., as shown in FIG. 33, an input form data extracting program 103*a*, a form determining program 103*b*, and a data generating program 103*c* can be stored in advance.

When these programs 103*a* to 103*c* are read and executed in the CPU 104, as shown in FIG. 33, an input form data extracting process 104*a*, a form determining process 104*b*, and a data generating process 104*c* are realized. The input form data extracting process 104*a* corresponds to the logical structure recognizing unit 32 shown in FIG. 1. Similarly, the form determining process 104*b* corresponds to the logical structure collating unit 33 and the optimum registered form selecting unit 34, and the data generating process 104*c* corresponds to the registered form generating unit 35.

The HDD 102 includes a registered form table 102*a* which stores a plurality of forms in advance, a generic logical structure table 102*b* which stores a logical structure representing logical elements in various forms and a relation between the logical elements, and a registered form data table 102*c* which, in association with various forms stored in the registered form DB 21, stores registered form data representing logical elements of the registered form acquired on the basis of the logical structure stored in the generic logical structure DB 22, pieces of position information of the logical elements, and a relation between the logical elements. The registered form table 102*a* corresponds to the registered form DB 21 shown in FIG. 1, the generic logical structure table 102*b* corresponds to the generic logical structure DB 22, and the registered form data table 102*c* corresponds to the registered form data DB 23.

The programs 103*a* to 103*c* need not be always stored in the ROM 103. For example, the programs 103*a* to 103*c* may be stored in, in addition to a "portable physical medium" such as a flexible disk (FD), a CD-ROM, an MO disk, a DVD disk, a magnetooptical disk, or an IC card inserted in the computer system 100, a "fixing physical medium" such as a hard disk drive (HDD) arranged inside or outside the computer system 100 or "another computer system" connected to the computer system 100 through a public line, the Internet, a LAN, a WAN, or the like, and read and executed by the computer system 100.

What is claimed is:

1. A non-transitory computer readable recording medium storing a form data extracting program causing a computer to execute operations, the operations comprising:

extracting logical elements concerning various forms from a generic logical structure storing unit that stores logical structure indicating a relation between each of the logical elements;

storing a registered form data that includes the logical elements that are extracted, a plurality of position information about each of the logical elements, and relation information between one or more of the logical elements, in association with the various forms in a registered form data storing unit;

receiving an image of a selected form;

extracting input form data for the image of the selected form, referring to the logical structure stored in the generic logical structure storing unit, the input form data including logical elements in the image, a plurality of position information of the logical elements on the image, and a relation information between one or more of the logical elements of the image;

specifying similar registered form data that is similar to the input form data, referring to the registered form data storing unit, on the basis of the input form data;

re-extracting another input form data from the image of the selected form, on the basis of the similar registered form data that includes—the plurality of position information and the relation information;

specifying missing logical elements among the logical elements included in the input form data, which cannot be re-extracted; and generating new registered form data that includes the other input form data, missing logical elements, position information of the missing logical elements and relation information of the missing logical elements.

2. The non-transitory computer readable recording medium according to claim 1 on which a form data extracting program is recorded, wherein:

the registered form data storing unit stores an evaluation value representing weights of logical elements of the registered form data, and the form specifying procedure, on the basis of the input form data extracted by the input form data extracting procedure and evaluation value of the logical elements of the registered form data, specifies registered form data similar to the input form data extracted by the input form data extracting procedure in the registered form data storing unit.

3. The non-transitory computer readable recording medium according to claim 1 on which a form data extracting program is recorded, wherein, the form specifying procedure, when a form specifying request which requests registered form data similar to the input form data in addition to registered form data similar to the input form data is received from the data generating procedure, specifies secondary registered form data similar to the input form data in the registered form data except for the specified registered form data, and the data generating procedure, on the basis of the pieces of position information of the logical elements of the registered form data similar to the input form data specified by the form specifying procedure and a relation between the logical elements, re-extracts input form data from the input form, when a logical element which cannot be re-extracted from the input form is present, re-extracts the input form data from the input form on the basis of the pieces of position information of logical elements of the secondary registered form data obtained by transmitting the form specifying request to the form specifying procedure, and generates the re-extracted input form data as new registered form data.

4. The non-transitory computer readable recording medium according to claim 1, wherein each time the form specifying request is received from the data generating procedure, the form specifying procedure specifies registered form data similar to the input form data in the registered form data except for the specified registered form data in the registered form data storing unit, and the data generating procedure, on the basis of (a) the pieces of position information of logical elements of registered form data similar to the input form data specified by the form specifying procedure and (b) a relation between the logical elements, re-extracts the input form data from the input form, and, when the logical element which cannot be re-extracted from the input form is present, generates the reextracted input form data as new registered form data after transmission of a form specifying request to the form specifying procedure is repeated a predetermined number of times.

5. The non-transitory computer readable recording medium according to claim 1, wherein in a plurality of regions of the input form data extracted by the input form data extracting procedure, the form specifying procedure specifies a plurality of registered form data having regions which are matched with only the regions in the registered form data storing unit, and the data generating procedure, on the basis of the pieces of position information of logical elements of the plurality of registered form data specified by the form specifying procedure and a relation between the logical elements, re-extracts a plurality of input form data from the input form, and combines the plurality of re-extracted input form data to each other to generate the input form data as new registered form data.

6. The non-transitory computer readable recording medium according to claim 1, wherein the form specifying procedure compares four apexes of a circumscribed rectangle of each of the logical elements in the input form data extracted by the input form data extracting procedure with four apexes of a circumscribed rectangle of each of the logical elements in the registered form data stored in the registered form data storing unit to determine a specific logical element in the input form data corresponding to each of the logical elements in the registered form data, so that the registered form data similar to the input form data is specified in the registered form data storing unit.

7. A form data extracting apparatus which extracts a logical structure of an input form, comprising:

a logical elements extracting unit which extracts logical elements concerning various forms from a generic logical structure storing unit that stores logical structure indicating a relation between one or more of the logical elements and another logical element respectively;

a registered form storing unit which stores a registered form data that includes the logical elements that are extracted, a plurality of position information about each of the logical elements, and relation information between one or more of the logical elements and another logical element, in association with the various forms in the registered form storing unit;

a receiving unit which receives an image of a selected form;

an input form data extracting unit which extracts input form data for the image of the selected form, referring to the logical structure stored in the generic logical structure storing unit, the input form data including logical elements in the image, a plurality of position information of the logical elements on the image, and relation information between one or more of the logical elements of the image and another logical element;

a specifying unit which specifies similar registered form data that is similar to the input form data in the registered form data storing unit;

a re-extracting unit which re-extracts another input form data from the image of the selected form on the basis of the similar registered form data that includes the plurality of position information and the relation information;

a specifying missing logical elements unit which specifies missing logical elements among the logical elements included in the input form data, which cannot be re-extracted; and a generating unit which generates new registered form data that includes the other input form data, missing logical elements, position information of the missing logical elements and the relation information of the missing logical elements.

8. A method of extracting a logical structure of an input form, comprising:

extracting logical elements concerning various forms from a generic logical structure storing unit that stores logical structure indicating a relation between each of the logical elements and another logical element respectively, storing a registered form data that includes the logical structure representing the logical elements in the various forms, the relation between the logical elements that are extracted, the acquired logical elements on the registered form, a plurality of position information about each of the logical elements, and relation information between each of the logical elements and another logical element;

receiving an image of a selected form;

extracting input form data for the image of the selected form, referring to the logical structure stored in the generic logical structure storing unit, the input form data including, the logical structure in the image, the relation between the logical elements, the logical elements on the image, (b) a plurality of position information of the logical elements on the image, and relation information between each of the logical elements of the image and another logical element;

specifying similar registered form data that is similar to the input form data on the basis of the input form data;

re-extracting another input form data from the image of the selected form, on the basis of the similar registered form data that includes of the plurality of position information, and the relation information;

specifying missing logical elements among the logical elements included in the input form data, which cannot be re-extracted; and generating new registered form data that includes the other input form data, missing logical elements, position information of the missing logical elements and relation information of the missing logical elements.

* * * * *